United States Patent
van't Westeinde et al.

(10) Patent No.: US 12,163,795 B2
(45) Date of Patent: Dec. 10, 2024

(54) VEHICLE ROUTING WITH DYNAMIC SELECTION OF TURNS ACROSS OPPOSING TRAFFIC

(71) Applicant: ORACLE INTERNATIONAL CORPORATION, Redwood Shores, CA (US)

(72) Inventors: Charles Pieter van't Westeinde, Black Rock (AU); Svetlana Mizina, Clarinda (AU)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 17/369,074

(22) Filed: Jul. 7, 2021

(65) Prior Publication Data
US 2023/0019662 A1    Jan. 19, 2023

(51) Int. Cl.
*G01C 21/34* (2006.01)
*G05D 1/00* (2024.01)
(Continued)

(52) U.S. Cl.
CPC ..... *G01C 21/3492* (2013.01); *G01C 21/3415* (2013.01); *G05D 1/0214* (2013.01); *G08G 1/0133* (2013.01); *G08G 1/20* (2013.01)

(58) Field of Classification Search
CPC ............ G01C 21/3492; G01C 21/3415; G05D 1/0214; G05D 2201/0213; G08G 1/0133; G08G 1/20
See application file for complete search history.

(56) References Cited

U.S. PATENT DOCUMENTS

| 5,504,482 A | * | 4/1996 | Schreder | ................ G01S 13/931 |
| | | | | 340/995.13 |
| 5,508,931 A | * | 4/1996 | Snider | ..................... G01C 21/30 |
| | | | | 73/178 R |

(Continued)

FOREIGN PATENT DOCUMENTS

| EP | 2 136 345 A1 | 12/2009 |
| WO | 2017120458 A1 | 7/2017 |

(Continued)

OTHER PUBLICATIONS

Jacopo Prisco, CNN; Why UPS trucks (almost) never turn left; CNN World, Live TV, Feb. 23, 2017; pp. 1-6; downloaded from: https://edition.cnn.com/2017/02/16/world/ups-trucks-no-left-turns/index.html.

(Continued)

*Primary Examiner* — Jess Whittington
*Assistant Examiner* — Terry C Buse
(74) *Attorney, Agent, or Firm* — Kraguljac Law Group, LLC

(57) ABSTRACT

Systems, methods, and other embodiments for vehicle route scheduling and navigation with dynamic selection of turns across opposing traffic are presented herein. In one embodiment, a method includes during development of a vehicle route from an arrival link through a node of a graph representing a road network, determining, for a departure link, that a path of the vehicle from the arrival link to the departure link crosses oncoming traffic, and in response to determining that that the path of the vehicle crosses oncoming traffic, adding an additional delay for the departure link to a route objective function representing the vehicle route; selecting the route including the path that crosses oncoming traffic to be an optimum route between a first location and a second location; including the optimum route in the delivery (Continued)

schedule for the vehicle; and transmitting the delivery schedule for execution.

20 Claims, 9 Drawing Sheets

(51) Int. Cl.
*G08G 1/00* (2006.01)
*G08G 1/01* (2006.01)

(56) References Cited

U.S. PATENT DOCUMENTS

| | | | |
|---|---|---|---|
| 6,704,645 B1* | 3/2004 | Beesley | G08G 1/096811 |
| | | | 701/423 |
| 8,423,283 B2 | 4/2013 | Cerecke et al. | |
| 9,037,406 B2 | 5/2015 | Mason et al. | |
| 9,772,197 B2 | 9/2017 | Huang et al. | |
| 10,126,136 B2 | 11/2018 | Iagnemma | |
| 10,304,018 B2 | 5/2019 | Mizina et al. | |
| 10,309,792 B2 | 6/2019 | Iagnemma | |
| 10,451,428 B2 | 10/2019 | Lathrop et al. | |
| 10,546,254 B2 | 1/2020 | van't Westeinde | |
| 10,740,702 B2 | 8/2020 | van't Westeinde | |
| 2010/0153005 A1 | 6/2010 | Cerecke et al. | |
| 2011/0112760 A1 | 5/2011 | Serbanescu et al. | |
| 2013/0038490 A1* | 2/2013 | Garcia | G01S 13/74 |
| | | | 342/451 |
| 2014/0172739 A1* | 6/2014 | Anderson | G06Q 10/0836 |
| | | | 705/338 |
| 2015/0177014 A1 | 6/2015 | Hosoi et al. | |
| 2017/0192437 A1 | 7/2017 | Bier et al. | |
| 2017/0200131 A1 | 7/2017 | van't Westeinde | |
| 2017/0213180 A1 | 7/2017 | van't Westeinde | |
| 2017/0356751 A1 | 12/2017 | Iagnemma | |
| 2018/0173380 A1 | 6/2018 | Mizina et al. | |
| 2018/0257660 A1* | 9/2018 | Ibrahim | G01S 5/0027 |
| 2018/0341893 A1 | 11/2018 | van't Westeinde et al. | |
| 2019/0120640 A1 | 4/2019 | Ho et al. | |
| 2022/0018663 A1* | 1/2022 | Biala | G08G 1/096725 |
| 2022/0290997 A1* | 9/2022 | Cserna | B60W 60/001 |
| 2022/0340137 A1* | 10/2022 | Ollis | B60W 30/09 |

FOREIGN PATENT DOCUMENTS

| | | |
|---|---|---|
| WO | 2017132128 A1 | 8/2017 |
| WO | 2018217992 A1 | 11/2018 |
| WO | 2020/075460 A1 | 4/2020 |

OTHER PUBLICATIONS

Graham Kendall; Why UPS drivers don't turn left and you probably shouldn't either; The Conversation; May 18, 2021; pp. 1-3; downloaded from: https://theconversation.com/why-ups-drivers-dont-turn-left-and-you-probably-shouldnt-either-71432.

Sarah Zielinski; Life Without Left Turns; smithsonianmag.com; Jan. 11, 2011; p. 1.

Anila Kennedy/ Oracle; Oracle Real-Time Scheduler, Map Editor User's Guide, 2.1.0.1 for Windows; Feb. 2012; pp. 1-60.

ORACLE; Oracle Real-Time Scheduler—Achieve a Profitable Service Business (Oracle Data Sheet); 2016; pp. 1-2.

Gitta; Dijkstra Algorithm: Short terms and Pseudocode; Jun. 20, 2021; pp. 1-2; downloaded from: www.gitta.info/Accessibiliti/en/html/Dijkstra_learningObject1.html.

U.S. Department of Transportation—National Highway Traffic Safety Administration; Analysis of Crossing Path Crashes; Jul. 2001; pp. 1-76.

Patent Cooperation Treaty, "International Search Report and Written Opinion", issued in PCT International Application No. PCT/US2022/031719, having a Date of Mailing of Aug. 29, 2022 (13 pgs).

\* cited by examiner

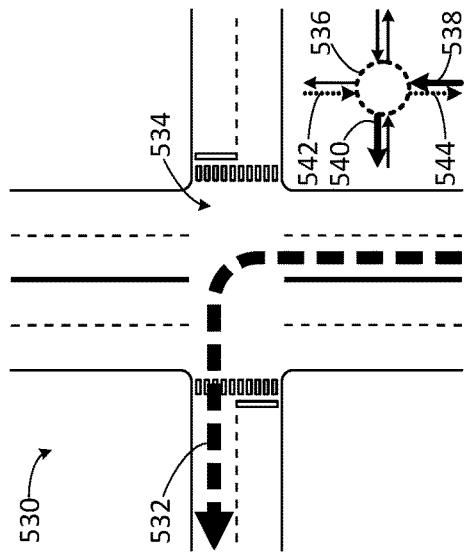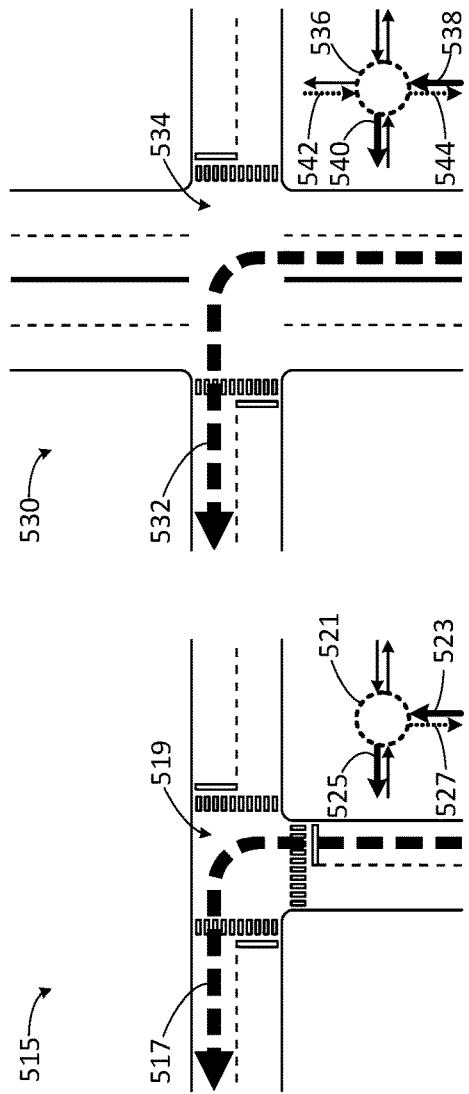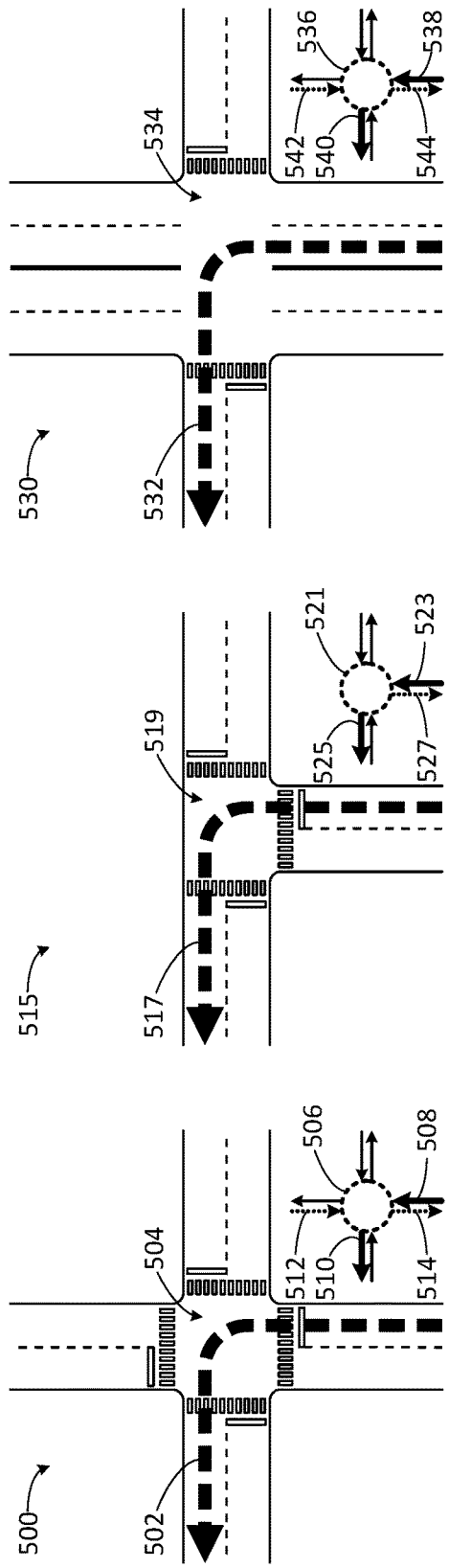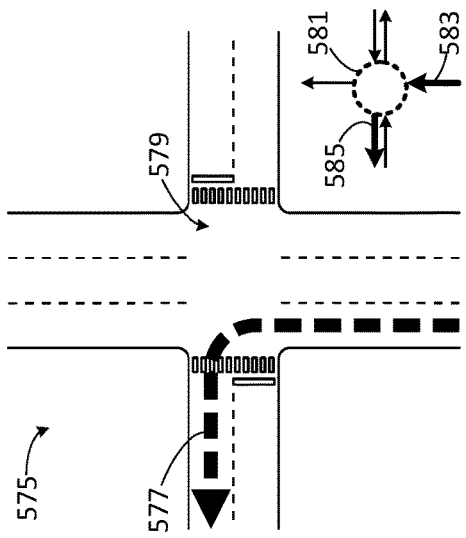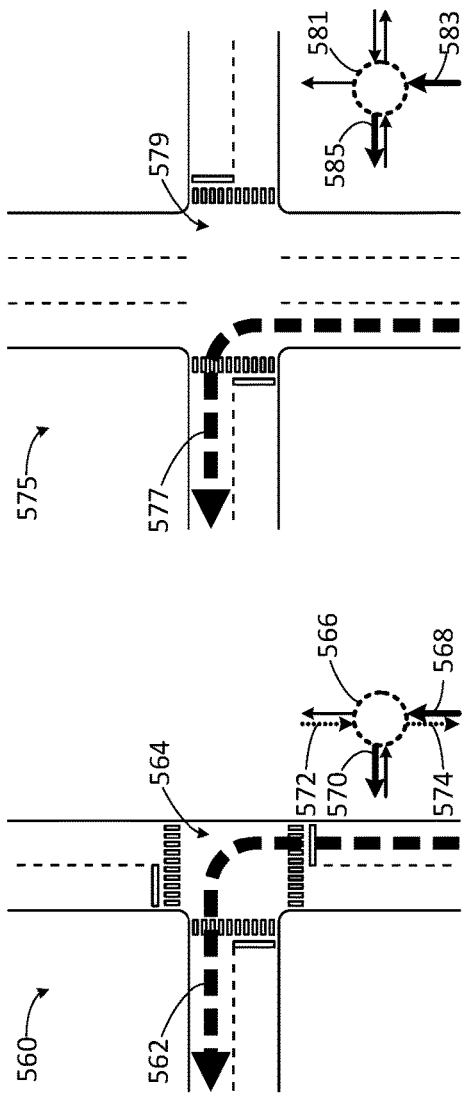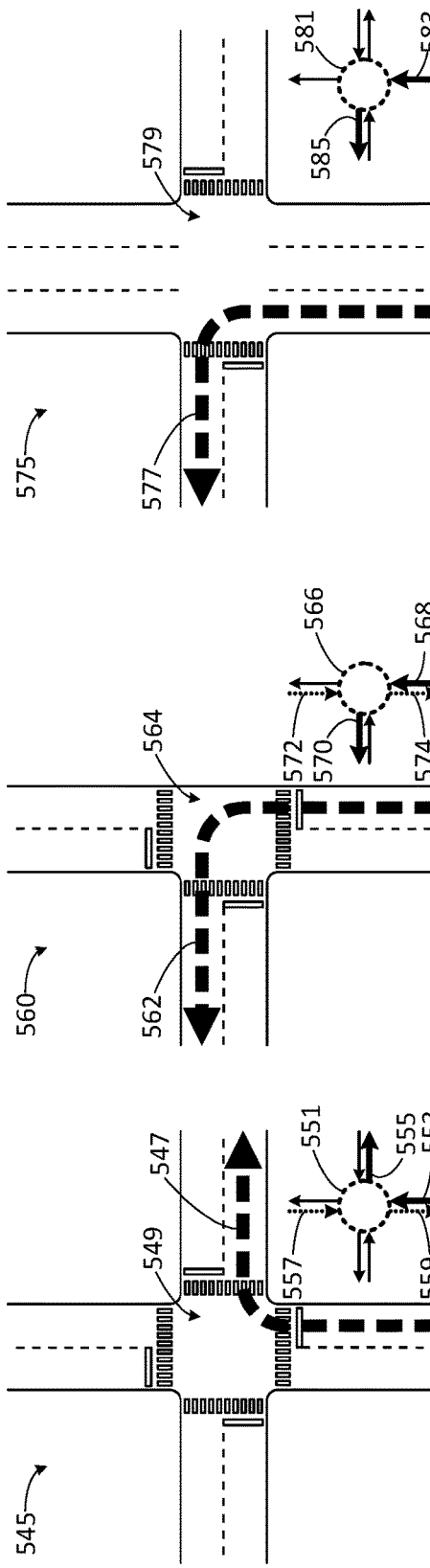

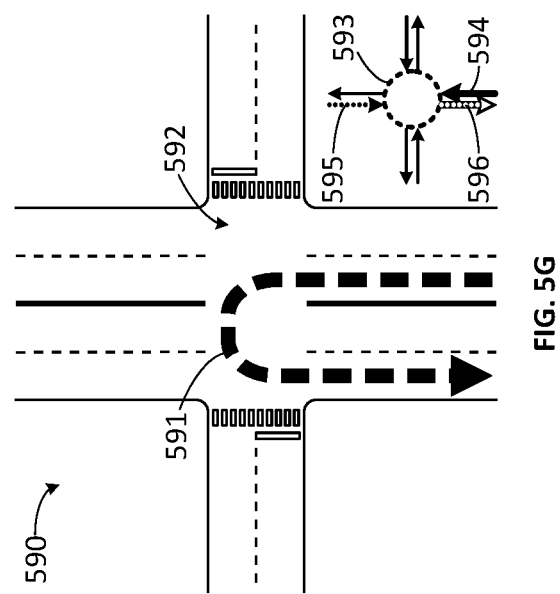

VEHICLE ROUTING WITH DYNAMIC SELECTION OF TURNS ACROSS OPPOSING TRAFFIC

BACKGROUND

Turns across oncoming traffic cause delays and increase risk of collision. Accordingly, operators of delivery vehicle fleets have implemented "hard" rules against cross-traffic turns in their vehicle routing, navigation, and delivery scheduling systems. However, such inflexible "hard" rules against cross-traffic turns introduce needless complexity and reduce flexibility in vehicle routing, navigation, and delivery scheduling.

Systems and methods to intelligently allow for cross-traffic turns where a cross-traffic turn is advantageous are therefore desired.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 5A illustrates an example diagram of a cross-traffic turn route through a 4-way intersection.

FIG. 5B illustrates an example diagram of a non-cross-traffic turn route through a T-intersection.

FIG. 5C illustrates an example diagram of a cross-traffic turn route through a 4-way intersection with multiple travel lanes.

FIG. 5D illustrates an example diagram of a non-cross-traffic turn route through a 4-way intersection.

FIG. 5E illustrates an example diagram of a cross-traffic turn route through a T-intersection.

FIG. 5F illustrates an example diagram of a non-cross-traffic turn route through an intersection involving a one-way road.

FIG. 5G illustrates an example diagram of a cross-traffic U-turn route through a 4-way intersection.

DETAILED DESCRIPTION

Figure 1:
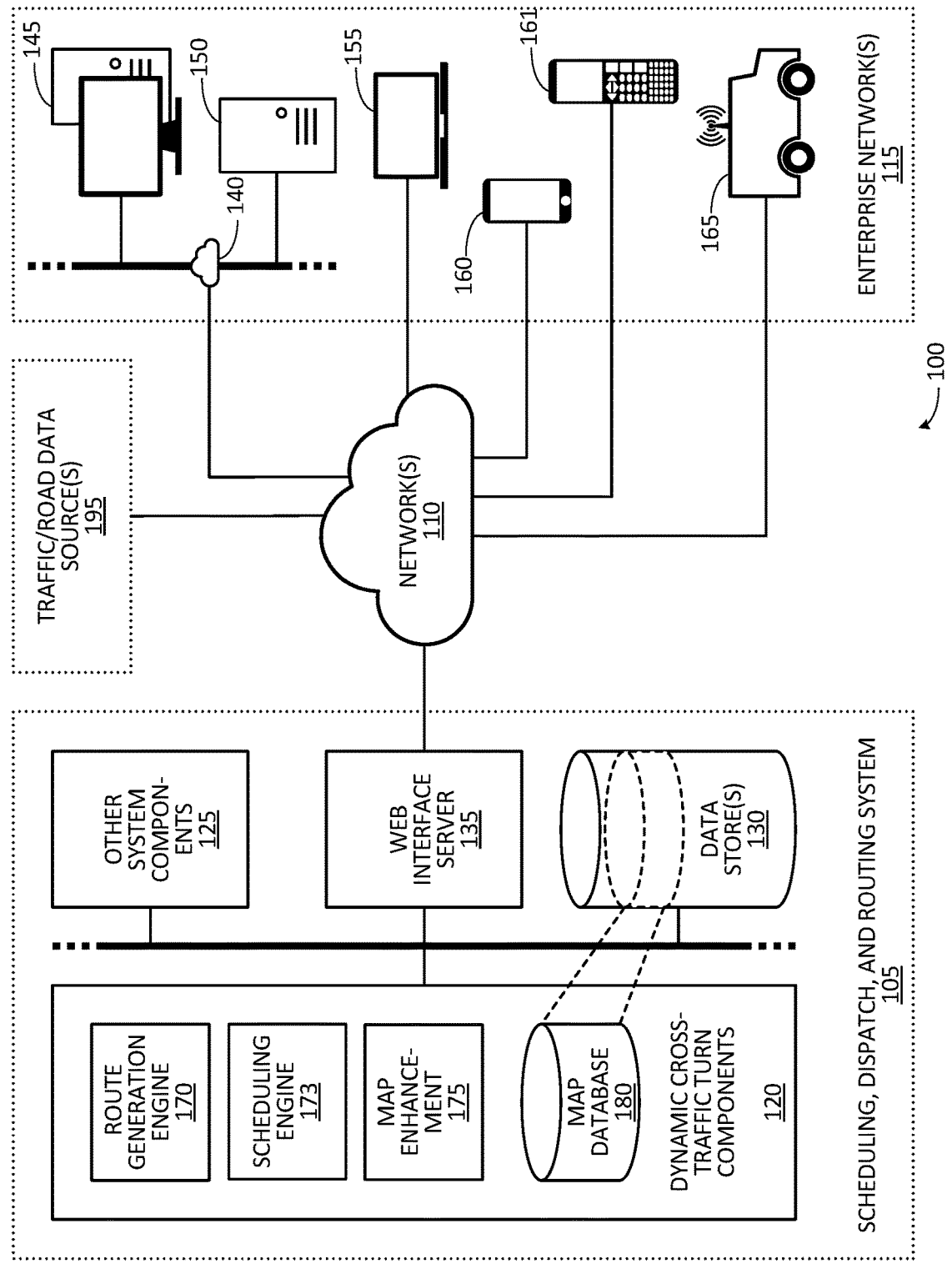
FIG. 1 illustrates one embodiment of a computing system associated with vehicle route scheduling and navigation with dynamic selection of turns across opposing traffic.

Systems and methods are described herein that provide for vehicle route scheduling and navigation with dynamic selection of turns across opposing traffic. For example, vehicle routing generated by the systems and methods described herein intelligently incorporates a turn across opposing traffic where the cross-traffic turn is more advantageous than routing options that avoid the cross-traffic turns. In one embodiment, systems and methods for route scheduling and navigation are described herein that provide for solving a multiple travelling salesman problem (MTSP) with turns across traffic.

Available road network historical travel times required to provide accurate travel times to MTSP solvers (retail delivery, utilities) do not incorporate the additional delays incurred by turns. Turns across oncoming traffic on busy roads can introduce significant delays and risk of accident. Therefore it may be desirable to re-arrange transportation jobs to minimize the overall need for turns across traffic and/or change a vehicle's route between jobs to avoid such turns. Taking these hidden delays into account when solving a transportation problem reduces both total travel time and scope for accidents.

In one embodiment, the systems and methods described herein identifies turns across traffic while calculating routes, and assigns estimate delays against such turns. The additional delays are passed on to the routing and scheduling objective functions, causing the solver to adapt the resulting schedule in such a way that the impact of the "across opposing traffic" turns is minimized. But, a "hard" rule against making turns across traffic in all cases may also add unnecessary complexity and accompanying delays to the vehicle's route. Accordingly, systems and methods that generate routes that incorporate turns across traffic only in appropriate circumstances—for example, when opposing traffic is light and therefore causes little delay or increase in risk, or when opposing traffic is heavier but there is no other routing option with a lower objective cost—may be desirable.

In one embodiment of the systems and methods described herein, a dynamic model takes account of the fact that turn-times are greatly impacted by traffic density. For example, in this dynamic model: (1) Links are tagged with their compass heading, allowing a routing algorithm to quickly determine whether a candidate path through the node crosses opposing traffic; (2) Links are tagged as either residential or non-residential—turns across residential traffic do not normally incur delays; and (3) Links are tagged with speed limits—turn delays may be estimated from the ratio between speed-limit and historical speeds.

Turns across opposing traffic are a source of delays and accidents that are not captured by current traffic models used by commercial MTSP solvers. The systems and methods described herein, by including this source of delays, re-organize an MTSP solution to minimize the total number of slow, risk-prone "across opposing traffic" turns, either by re-arranging work between vehicles to reduce the number of slow turns, or by routing vehicles around them. The result is a more accurate model of the real world, which allows a solver to generate solutions with less actual travel time and increased safety. It is noteworthy that the systems and methods herein do not apply "hard" avoidance of turns across traffic. Instead, the systems and methods herein enable dynamic avoidance of turns across traffic: turns across traffic are avoided only if a better alternative can be found.

In one embodiment, the systems and methods herein implement a preprocessing phase, preparing the graph which is used as input to a shortest-path solver algorithm—such as Dijkstra's Algorithm—that generates the routes in a route computation phase. In one embodiment, the preprocessing phase computes a "residential" flag from source road data, and stores the flag for each link. In one embodiment, the preprocessing phase obtains speed limits from the source road data, and stores the speed limit for each link. In one embodiment, in the preprocessing phase when building the graph, the preprocessing phase obtains the end point coordinates for each link, and uses these to tag each link with a compass heading.

In one embodiment, the systems and methods herein implement a route computation phase by executing a path solver algorithm to generate routes. In one embodiment, during the route computation phase, when developing or processing a link arriving at a node, the computation phase checks for each departing link whether an arriving, non-residential road crosses the vehicle's path across the intersection. If so, the computation phase computes an estimated delay, and adds that delay to the objective function. Where traffic incident reduction is of significant importance, a further numerical toll may also be added to the objective function along with the delay.

No action or function described or claimed herein is performed by the human mind. An interpretation that any action or function can be performed in the human mind is inconsistent with and contrary to this disclosure.

—Example Environment—

FIG. 1 illustrates one embodiment of a computing system 100 associated with vehicle route scheduling and navigation with dynamic selection of turns across opposing traffic.

In one embodiment, system 100 includes a scheduling, dispatch, and routing system 105 connected by the Internet 110 (or another suitable communications network or combination of networks) to an enterprise network 115. In one embodiment, scheduling, dispatch, and routing system 105 may be Oracle® Real-Time Scheduler (RTS), UPS® On-Road Integrated Optimization and Navigation (ORION), or other system configured to execute the methods for vehicle route scheduling and navigation with dynamic selection of turns across opposing traffic. In one embodiment, scheduling, dispatch, and routing system 105 includes various systems and components which include dynamic cross-traffic turn components 120, other system components 125, data store(s) 130, and web interface server 135.

In one embodiment, dynamic cross-traffic turn components 120 include one or more components configured for implementing methods, functions, and features described herein associated with route scheduling and navigation by solving MTSP with turns across traffic. Dynamic cross-traffic turn components 120 may include a route generation engine 170 configured to develop shortest paths between nodes of a road network graph that dynamically include cross-traffic turns in the route, in accordance with the systems and methods described herein. The shortest paths are not necessarily shortest in terms of travel distance. In one embodiment, the shortest-path solver operates to find the path that is "shortest" in that it has the least objective cost to the travel, based on an objective cost function. The objective cost function may include inputs for travel time, travel distance, cross-traffic turns or other traffic hazards, or other items that make up an overall burden to travel along a path. Dynamic cross-traffic turn components 120 may include a route generation engine 170 that identifies least-cost routes between geographic points in road networks represented as graphs. Dynamic cross-traffic turn components 120 may include a scheduling engine 173 that determines which delivery items are assigned to which routes, and the order of delivery of those items. Dynamic cross-traffic turn components 120 may include a map enhancement (pre-processing) module to generate information used by the systems and methods described herein for dynamic inclusion of cross-traffic turns in vehicle routing, and to insert this information into the graphs representing road networks for use. Dynamic cross-traffic turn components 120 may include a map database 180 that stores one or more graphs representing road networks that may be configured to support the dynamic inclusion of cross-traffic turns in vehicle routing.

Each of the components of scheduling, dispatch, and routing system 105 is configured by logic to execute the functions that the component is described as performing. In one embodiment, the components of scheduling, dispatch, and routing system 105 may each be implemented as sets of one or more software modules executed by one or more computing devices specially configured for such execution. In one embodiment, the components of scheduling, dispatch, and routing system 105 are implemented on one or more hardware computing devices or hosts interconnected by a data network. For example, the components of scheduling, dispatch, and routing system 105 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of scheduling, dispatch, and routing system 105 are each implemented by one or more dedicated computing devices. In one embodiment, several or all components of scheduling, dispatch, and routing system 105 are implemented by a common (or shared) computing device, even though represented as discrete units in FIG. 1. In one embodiment, components of scheduling, dispatch, and routing system 105 may be implemented across multiple computing devices. In one embodiment, scheduling, dispatch, and routing system 105 may be implemented as a service on cloud infrastructure. In one embodiment, scheduling, dispatch, and routing system 105 may be hosted by a dedicated third party, for example in an infrastructure-as-a-service (IAAS), platform-as-a-service (PAAS), or software-as-a-service (SAAS) architecture. In one embodiment, scheduling, dispatch, and routing system 105 may be implemented on on-premises infrastructure, such as by a set of one or more servers within enterprise network 115 dedicated to operation of scheduling, dispatch, and routing system 105.

In one embodiment, the components of scheduling, dispatch, and routing system 105 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of scheduling, dispatch, and routing system 105 may (i) generate or compose an electronic message or signal to issue a command or request to another component, (ii) transmit the message or signal to other components using the infrastructure of scheduling, dispatch, and routing system 105 and (iii) parse the content of an electronic message or signal received to identify commands or requests that the component can perform, and in response to identifying the command, the component will automatically perform the command or request.

API calls may include queries against databases. Where queries are executed on graphs, they may for example be composed and executed in Oracle's® Property Graph Query Language (PGQL) and its associated runtime, GraphQL and its associated runtime, or other appropriate graph query environments.

Enterprise network 115 may be associated with a business, such as a delivery service or other entity that operates fleets of vehicles. For simplicity and clarity of explanation, enterprise network 115 is represented by an on-site local area network 140 to which one or more personal computers 145, or servers 150 are operably connected, along with one or more remote user computers 155, mobile devices 160, handheld delivery information terminal 161, or autonomous or self-driving vehicles 165 that are connected to the enterprise network 115 through the Internet 110. Each personal computer 145, remote user computer 155, mobile device 160, or handheld delivery information terminal 161 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smart phone, tablet computer, mobile phone, or other handheld portable computing device having the ability to connect to local area network 140 or Internet 110 through wireless networks, such as cellular telephone networks, Wi-Fi, or Bluetooth. Handheld delivery information terminal 161 can be, for example, a portable combination bar/QR/other code scanning device, delivery information access device, and GPS navigation device, (such as a USPS® Mobile Delivery Device (MDD), UPS® Delivery Information Acquisition Device (DIAD) or other similar device).

Users of the enterprise network 115 interface with scheduling, dispatch, and routing system 105 across the Internet 110 (or another suitable communications network or combination of networks). In one embodiment, remote computing systems (such as those of enterprise network 115, including autonomous vehicles 165) may access information or applications provided by scheduling, dispatch, and routing system 105 through web interface server 135. In one embodiment, the remote computing system may send requests to and receive responses from web interface server 135. In one example, access to the information or applications may be effected through use of a web browser on a personal computer 145, remote user computers 155, mobile device 160, or autonomous vehicle 165. In one example, access to the information or applications may be effected through use of a dedicated client application specific to scheduling, dispatch, and routing system 105 executing on a personal computer 145, remote user computers 155, mobile device 160, or autonomous vehicle 165. For example, these computing devices 145, 155, 160, 161 of the enterprise network 115 may request display of a delivery schedule (in whole or in part) in a graphical user interface. In one example, communications may be exchanged between web interface server 135 and personal computer 145, server 150, remote user computers 155 or mobile device 160, and may take the form of remote representational state transfer (REST) requests using JavaScript object notation (JSON) as the data interchange format for example, or simple object access protocol (SOAP) requests to and from XML servers. For example, computers 145, 150, 155 of the enterprise network 110 may request a delivery schedule.

In one embodiment, data store 160 includes one or more databases, including map database 180 configured to store and serve maps, as well as other databases configured too store and serve, routes, loading plans, shipping information, cargo manifests, vehicle or service crews, or other information used by scheduling, dispatch, and routing system 105. In one embodiment, the databases used herein are Oracle® databases. In some example configurations, data store(s) 160 may be implemented using one or more Oracle® Exadata compute shapes, network-attached storage (NAS) devices and/or other dedicated server device.

In one embodiment, the routing of one or more autonomous vehicles 165 may be controlled by scheduling, dispatch, and routing system 105. The autonomous vehicle 165 may be either partially or fully self-driving. The autonomous vehicle 165 may be a delivery vehicle, a freight vehicle, a construction vehicle, a garbage collection vehicle, a work crew transport vehicle, a public transit vehicle, a ride-sharing or taxi vehicle, a personal transportation vehicle, or other self-propelled vehicle.

—Graphs, Nodes, and Links—

In one embodiment, a graph data structure may represent a road network or road map as a set of interconnected nodes and links. In a graph data structure representing a road network, a node is a data structure that represents a geographical location where a turn may be made, such as an intersection or bend in the road. In a graph data structure representing a road network, a link (or directed edge) is a data structure that represents a traffic route between nodes (intersections, bends, or other geographical locations) that are adjacent or no more than one link away from each other in the graph. Note that links are directional.

In one embodiment, a road network is represented as a graph data structure in a graph database, with accompanying road source data describing features of the map (or graph), traffic routes (or links), and intersections (or nodes) stored in data structures describing those components. For example, map database 180 may be a graph database storing one or more road networks (or maps) in this form. Additional data fields may be provided in the data structures of the graph, links, and nodes to accommodate particular information used by the methods and systems described herein.

Figure 2:
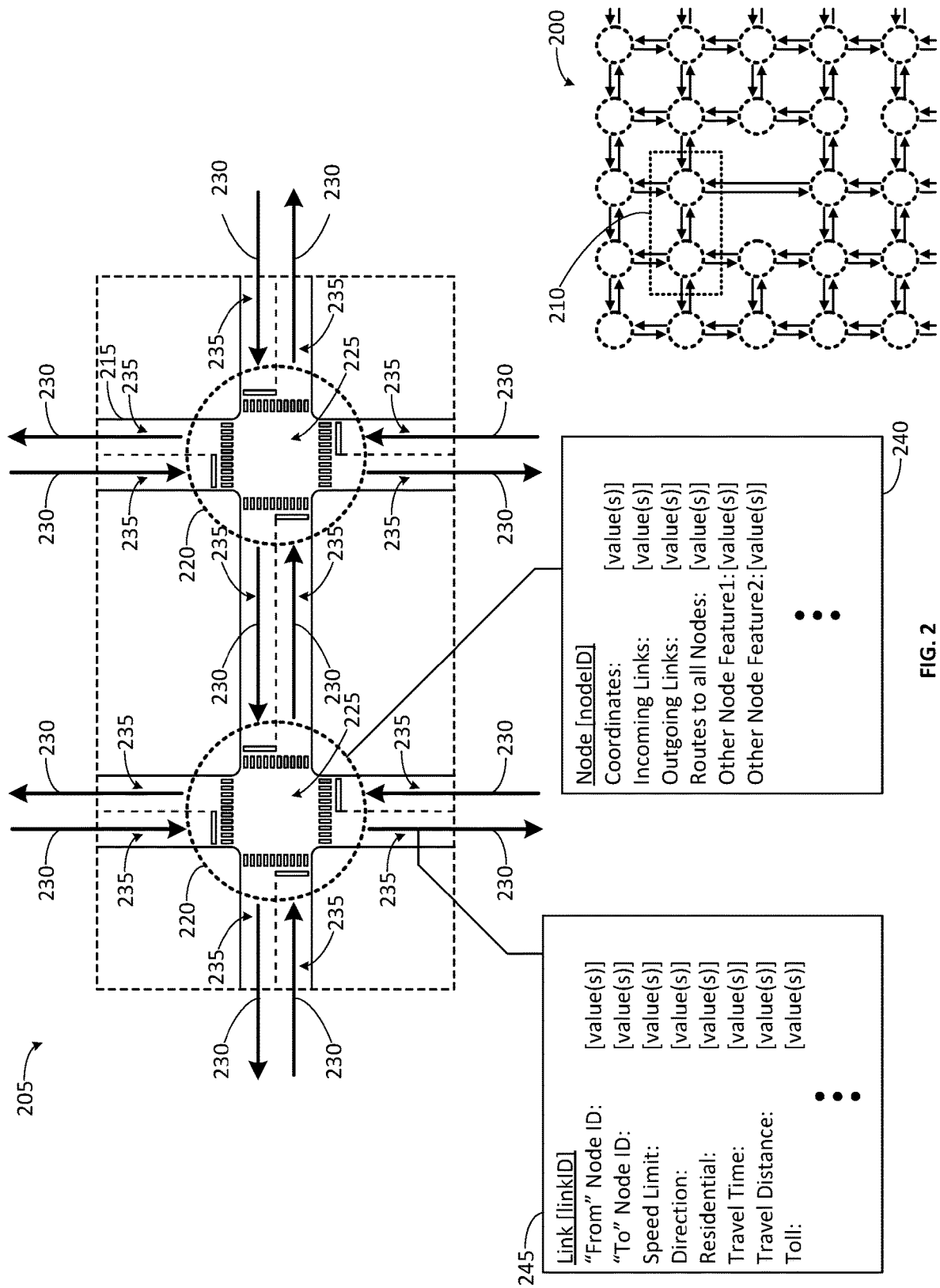
FIG. 2 illustrates an example graph representing a road map, including a detail section of the graph, associated with vehicle route scheduling and navigation with dynamic selection of turns across opposing traffic.

FIG. 2 illustrates an example graph 200 representing an example road network associated with vehicle route scheduling and navigation with dynamic selection of turns across opposing traffic, including an enlarged view 205 of a portion 210 of graph 200 superimposed over a visualization of a corresponding portion of the example road network 215. Graph 200 is made up of nodes 220 representing specific intersections 225 (or bend or other geographic feature) in the example road network 215, and links 230 representing specific, directional road segments 235 in the example road network 215. In one embodiment, nodes 220 may also represent delivery pick-up, drop-off, or service locations along the road network, for example specific addresses. Discussions of nodes referring to intersections may be understood also to refer to bends in roads, specific address locations, and other geographic features of the road network represented by the graph.

In example graph 200, the nodes 220 may be represented as node data structures describing the underlying intersection 225, such as node data structure 240. In one embodiment, a node data structure such as node data structure 240 is configured to include data structures such as a node identifier (nodeID) field or other data structure for storing a value uniquely associated with the node; coordinate (nodeCoordinates) field or other data structure for storing coordinate values—such as latitude and longitude—of the geographic location of the underlying intersection 225 represented by the node; lists of incoming (nodeIncomingLinks) and outgoing (nodeOutgoingLinks) links; least-cost (fastest/shortest) routes to all other nodes in the graph (nodeRoutes) and associated properties such as travel time and travel distance of each route (or other cost to reach the node from the origin node); and other data structures representing other features of the node.

In example graph 200, the links 230 may be represented as link data structures describing the underlying traffic routes (or road segments) 235, such as link data structure 245. In one embodiment, a link data structure such as link data structure 245 is configured to include data structures describing particular features of the underlying traffic route 235. The link data structure 245 may be configured to include a link identifier (linkID) field or other data structure. The value of the link identifier data structure is uniquely associated with the link in the graph. The link data structure 245 may be configured to include a "from" node ID (nodeA_ID) field or other data structure indicating the node from which the link originates and a "to" node ID (nodeB_ID) field or other data structure indicating the node which is the destination of the link. Together, the "from" node ID and the "to" node ID data structures describe the origin and destination, respectively, of the traffic travel represented by the link along the road segment. The link data structure 245 may be configured to include a speed limit (linkSpeedLimit) field or other data structure indicating the legal speed limit along the road segment represented by the link. The link data structure 245 may be configured to include a direction (linkDirection) field or other data structure indicating a compass heading of travel along the road segment represented by the link. The link data structure 245 may be configured to include a residential street (linkResidential) flag or other data structure indicating whether the road segment represented by the link is considered to have only "residential" traffic. The residential flag indicates whether the traffic travelling along the link is light (residential) or non-light (non-residential) under the assumption that traffic along residential streets is generally light, causing little delay in a turn across oncoming traffic. The link data structure 245 may be configured to include a toll (linkToll) field or other data structure. As used herein, a "toll" is a penalty associated with travel along a road segment represented by a given link. The link data structure 245 may be configured to include additional data structures representing other features of the link.

—Example Methods—

In one embodiment, each step of computer-implemented methods described herein may be performed by a processor (such as processor 810 as shown and described with reference to FIG. 8) of one or more computing devices (i) accessing memory (such as memory 815 and/or other computing device components shown and described with reference to FIG. 8) and (ii) configured with logic to cause the system to execute the step of the method (such dynamic cross-traffic turn vehicle route scheduling and navigation logic 830 shown and described with reference to FIG. 8). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 815, or storage/disks 835 of computing device 805 or remote computers 865 shown and described with reference to FIG. 8, or in data stores 130 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 3:
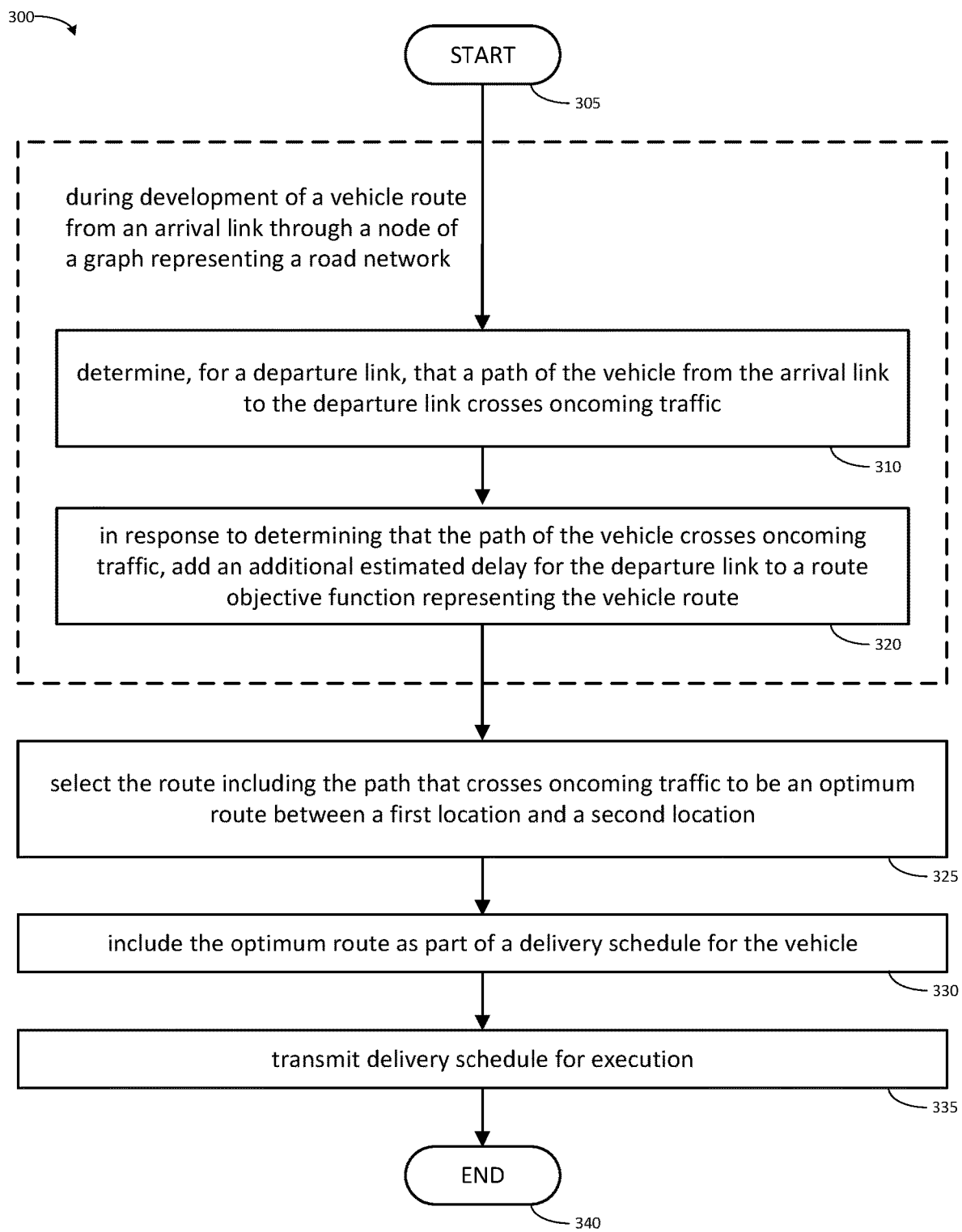
FIG. 3 illustrates one embodiment of a method associated with vehicle route scheduling and navigation with dynamic selection of turns across opposing traffic.

FIG. 3 illustrates one embodiment of a method 300 associated with vehicle route scheduling and navigation with dynamic selection of turns across opposing traffic. In one embodiment, the steps of method 300 are performed by scheduling and dispatch system 105, and at least in part by dynamic cross-traffic turn components 120 (as shown and described with reference to FIG. 1). In one embodiment, dynamic cross-traffic turn components 120 is implemented by a special purpose computing device (such as computing device 805) configured with dynamic cross-traffic turn vehicle route scheduling and navigation logic. In one embodiment, dynamic cross-traffic turn components 120 is one or more modules of a special purpose computing device configured with logic 830.

In one embodiment, the method 300 may be initiated automatically based on various triggers, such as in response to receiving a signal over a network or parsing stored data indicating that (i) a user (or administrator) of scheduling, dispatch, and routing system 105 has initiated method 300, (ii) that method 300 is scheduled to be initiated at defined times or time intervals—for example, daily, before items are loaded onto vehicles for delivery, (iii) a system component of scheduling, dispatch, and routing system 105 has automatically initiated method 300 based on the internal logic of the component. In one embodiment, the method 300 runs repeatedly once initiated, continuously evaluating alternative routing scenarios seeking a better route than the current best route, and determining the travel times for the alternatives as described herein. The method may evaluate hundreds of alternative route scenarios per second. Thus, the methods and systems described herein enable the dynamic evaluation of cross-traffic turns in real-time alternative route evaluation, and enabling the use of dynamically included cross-traffic turns in live vehicle navigation. The method 300 initiates at START block 305 in response to parsing a signal received or stored data retrieved and determining that the signal or stored data indicates that the method 300 should begin. Processing continues to process block 310.

In one embodiment, the operations of process blocks 310, 315, and 320 are executed during development by a route generation engine of a vehicle route from an arrival link through a node of a graph representing a road network. In one embodiment, development (or generation or creation) of a vehicle route includes executing steps of a shortest path solver to process links or nodes of a graph for inclusion (or not) into a route between nodes. In one embodiment, the route generation engine is a module of the dynamic cross-traffic turn component 120, such as route generation engine 170. In one embodiment, route generation engine 170 executes the functions described for process blocks 310, 315, and 320. In one embodiment, the route generation engine executes an algorithm for finding a shortest path between nodes in the graph. In one embodiment, the route generation engine executes Dijkstra's algorithm. In one embodiment, the route generation engine executes the A* algorithm, a breadth-first search, the Floyd-Warshall algorithm, the Bellman-Ford algorithm, Johnson's algorithm, or executes another algorithm to determine the shortest path between nodes in the graph. In one embodiment, the route generation engine operates to find a shortest path between each pair of nodes in the graph.

At process block 310, the processor determines, for a departure link, that a path of the vehicle from the arrival link to the departure link crosses oncoming traffic.

An arrival link is a link representing a road segment on which a vehicle arrives at the intersection represented by the node. The arrival link is a link directed from an immediately previous node included in a route by the route generation engine 170 to the present node. A departure link is a link representing a road segment on which a vehicle departs the intersection represented by the node. The departure link will be included in a route by the route generation engine 170 after the cross-traffic turn features of the path through the node to the departure link are developed. Oncoming traffic is traffic passing through the intersection represented by the node from an approximately opposite compass direction as traffic entering the intersection from the road segment represented by the arrival link.

Figure 4:
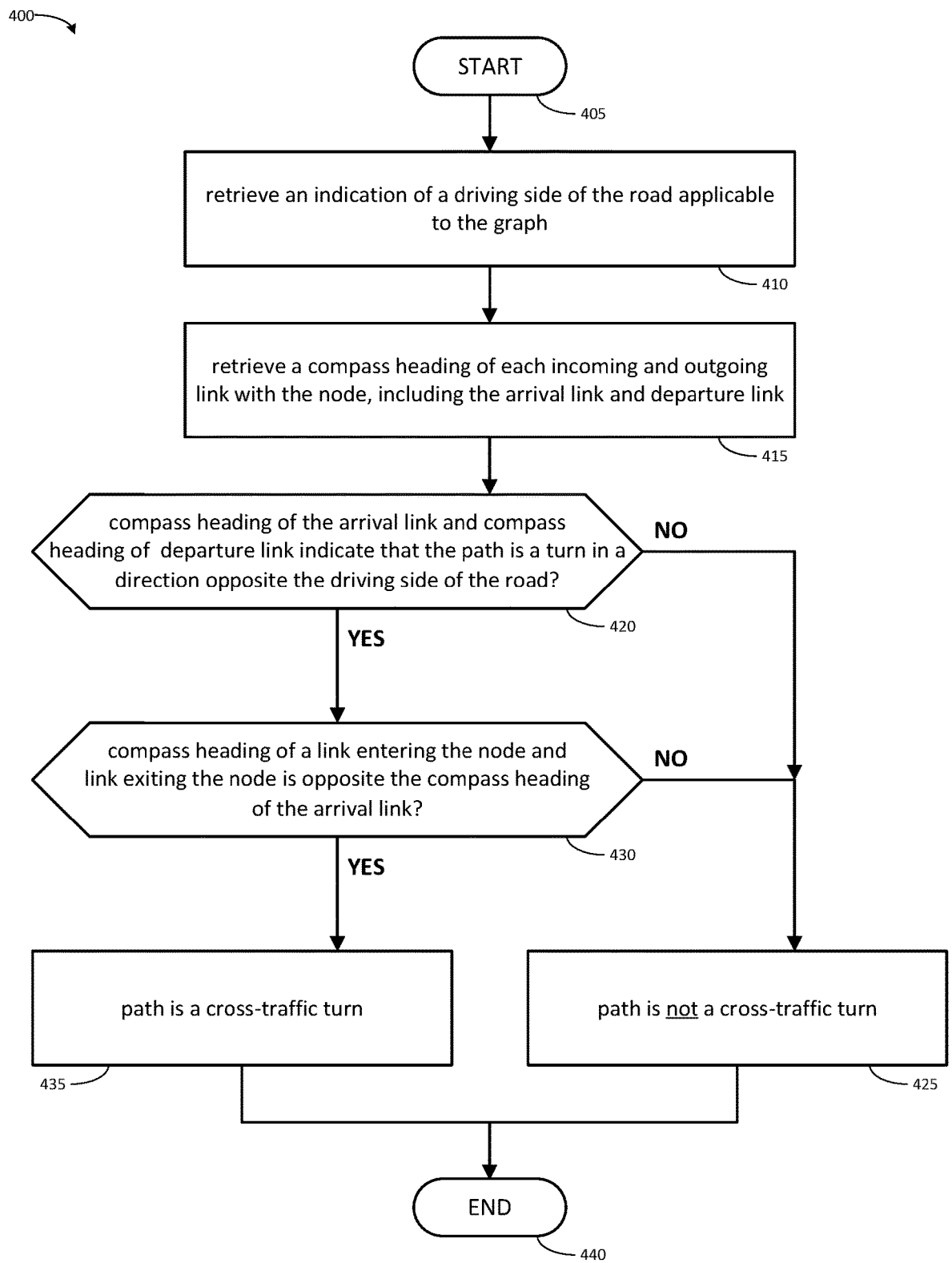
FIG. 4 illustrates an embodiment of a method for determining that a path from an arrival link to a departure link crosses oncoming traffic associated with vehicle route scheduling and navigation with dynamic selection of turns across opposing traffic.

FIG. 4 illustrates one embodiment of a method 400 for determining that a path from an arrival link to a departure link crosses oncoming traffic associated with vehicle route scheduling and navigation with dynamic selection of turns across opposing traffic. In one embodiment, the steps of method 400 are performed at least in part by route generation engine 170, as executed by a special purpose computing device (such as computing device 805) configured with dynamic cross-traffic turn vehicle route scheduling and navigation logic 830 to perform the steps. The method 400 may be initiated automatically based on various triggers, such as in response to receiving a signal over a network or parsing stored data indicating that (i) process block 310 of method 300 has been initiated, (ii) a user (or administrator) of scheduling, dispatch, and routing system has initiated method 300, (iii) that route generation engine 170 is evaluating a route through an intersection for inclusion in a route from one intersection to another intersection in a road network; or (iv) that method 400 is scheduled to be initiated at defined times or time intervals. The method 400 initiates at START block 405 in response to parsing a signal received or stored data retrieved and determining that the signal or stored data indicates that the method 400 should begin. Processing continues to process block 410.

At process block 410, the processor retrieves an indication of a driving side of the road applicable to the graph.

In bi-directional traffic, the driving side of the road is the side of the road in which it is permitted to drive forward. In some jurisdictions, such as in the United States, the driving side of the road is the right side of the road. In some jurisdictions, such as in Australia, the driving side of the road is the left side of the road. Thus, in right-hand traffic jurisdictions, a cross-traffic turn (or turn across oncoming traffic) is a left turn, and in left-hand traffic jurisdictions, a cross-traffic turn is a right turn.

Each graph is associated with a location (such as a city) within a traffic jurisdiction. In one embodiment, the rule of the road (left- or right-handedness of traffic) is stored as a property of the graph representing a road network in the data structure of the graph. This rule of the road property may serve as an indication of the driving side of the road. Where the rule of the road is not included in the graph, the rule of the road may be set as a universal property of scheduling, dispatch, and routing system 105 by administrators, for example among the dynamic cross-traffic turn components 120. In one embodiment, the processor may compose and execute a query to retrieve the indication of the driving side of the road either from the graph in map database 180, where applicable, or from system 105, where applicable. The processor may then store the indication of the driving side of the road in memory or storage for subsequent processing.

Once the processor has thus completed retrieving an indication of a driving side of the road applicable to the graph, processing at process block 410 completes, and processing continues to process block 415.

At process block 415, the processor retrieves a compass heading of each incoming and outgoing link with the node, including the arrival link and departure link.

A compass heading is a vector that defines a direction on Earth. In one embodiment, each link in a graph is assigned a compass heading indicating the direction of traffic flow along the road segment represented by the link, for example by map enhancement module 175 as described herein. In one embodiment, the compass heading is stored as a data structure within the link data structure, for example as shown and described with reference to FIG. 2. An incoming link is a link directed toward a node, representing traffic flowing along a road segment into the intersection represented by the node. An outgoing link is a link directed away from a node, representing traffic flowing along a road segment out of the intersection represented by the node. The arrival link belongs to the set of incoming links for the node, and the departure link belongs to the set of outgoing links for the node. In one embodiment, the processor may compose and execute a query to retrieve the set of links for the node, including both incoming and outgoing links. The processor then holds the set of links in memory for subsequent processing. Then, for each link in the set, the processor composes and executes a query to retrieve the compass heading, and holds them in memory or storage for subsequent processing.

Once the processor has thus completed retrieving a compass heading of each incoming and outgoing link with the node, including the arrival link and departure link, processing at process block 415 completes, and processing continues to decision block 420.

At decision block 420, the processor determines whether the compass heading of the arrival link and the compass heading of the departure link indicate that the path is a turn in a direction opposite the driving side of the road.

In one embodiment, the processor retrieves the compass heading of the arrival link and the compass heading of the departure link from memory or storage and compares them to each other to determine whether they indicate clockwise rotation (within 180 degrees) or a counterclockwise rotation in the compass heading along the path through the intersection from the arrival link to the departure link. The processor then interprets the compass heading change to determine a turn direction. A clockwise compass heading change indicates a right turn. A counterclockwise compass heading change indicates a left turn. The processor then compares the turn direction to the driving side of the road.

Where the turn direction and the driving side of the road match—right turn, right side driving or left turn, left side driving—then the path through the intersection is not a turn in a direction opposite the driving side of the road. The processor stores this determination in memory or storage for subsequent processing. Where the processor has thus determined that the compass heading of the arrival link and the compass heading of the departure link do not indicate that the path is a turn in a direction opposite the driving side of the road completed (420: NO), processing at decision block 420 completes, and processing continues to process block 425.

Where the turn direction and the driving side of the road do not match— right turn, left side driving or left turn, right side driving—then the path through the intersection is a turn in a direction opposite the driving side of the road. The processor stores this determination in memory or storage for subsequent processing. Where the processor has thus determined that the compass heading of the arrival link and the compass heading of the departure link do indicate that the path is a turn in a direction opposite the driving side of the road completed (420: YES), processing at decision block 420 completes, and processing continues to decision block 430.

In a special case, a U-turn may be identified as a cross-traffic turn when the compass heading of the arrival link and the departure link are approximately opposite each other. The processor determines that the path through the intersection is a turn in a direction opposite the driving side of the road when the compass heading of the arrival link and the departure link are approximately opposite. The processor stores this determination in memory or storage for subsequent processing. Where the processor has thus determined that determine that the compass heading of the arrival link and the compass heading of the departure link do indicate that the path is a turn in a direction opposite the driving side of the road completed (420: YES), processing at decision block 420 completes, and processing continues to decision block 430.

At decision block 430, the processor determines whether a first compass heading of a first link (or, of a first link exiting, or of both a first link entering and a first link exiting) entering the node is opposite the compass heading of the arrival link.

In one embodiment, the processor retrieves the compass headings of each of the incoming links, and each of the outgoing links. The processor compares the compass heading of the arrival link with the compass heading of each of the other incoming links of the node to determine if the incoming link has a compass heading approximately opposite the compass heading of the arrival link. Such an incoming link may be referred to herein as an opposing traffic arrival link. The processor compares the compass heading of the arrival link with the compass heading of each of the outgoing links (in one embodiment excluding the departure link) of the node to determine if the outgoing link has a compass heading approximately opposite the compass heading of the arrival link. Such an outgoing link may be referred to herein as an opposing traffic departure link. The processor then determines whether any pair of an opposing traffic arrival link and an opposing traffic departure link have compass headings approximately opposite the compass heading of the arrival link. The processor stores the results of its determination for subsequent processing and storage. The presence of both an opposing traffic arrival link and an opposing traffic departure link indicates the presence of opposing traffic. The absence of both an opposing traffic arrival link and an opposing traffic departure link indicates the absence of opposing traffic.

In one embodiment, a compass heading is "approximately" a direction when it is within 45 degrees to either side of that direction. Narrower ranges down to 0 degrees away from the direction may also be appropriate. The approximation allows for the compass headings of each link being derived from the coordinates of the "from" node and "to" node of the link, rather than exactly matching the physical arrangement of the underlying road segment at the intersection. The approximation also allows for intersections that are not perfect right angles. There may exist edge case intersections where cross-traffic turns will not be correctly identified due to this simple approximation. Additional logic may be implemented to improve identification.

Once the processor has thus completed determining that a first compass heading of a first link entering the node and of a first link exiting the node is not opposite the compass heading of the arrival link (430: NO), processing at decision block 430 completes, and processing continues to process block 425. Once the processor has thus completed determining that a first compass heading of a first link entering the node and of a first link exiting the node is opposite the compass heading of the arrival link (430: YES), processing at decision block 430 completes, and processing continues to process block 435.

At process block 435, the processor registers the determination that the path through the intersection is a cross-traffic turn, for example by writing this result to memory or storage for later retrieval and use in subsequent processing. Processing at process block 435 then completes, and processing continues to END block 440, where process 400 ends.

At process block 425, the processor registers the determination that the path through the intersection is not a cross-traffic turn, for example by writing this result to memory or storage for later retrieval and use in subsequent processing. Processing at process block 425 then completes, and processing continues to END block 440, where process 400 ends.

Referring again to process block 310 of method 300 in FIG. 3, once the processor has thus completed determining, for a departure link, that a path of the vehicle from the arrival link to the departure link crosses oncoming traffic, processing at process block 310 completes, and processing continues to process block 320.

FIGS. 5A-5F show a selection of example routes through intersection where method 400 may be applied. The selected routes are not exhaustive, and method 400 may be applied to most common intersection types. There may be intersections that are edge cases that may need additional logic to determine whether a turn is across oncoming traffic or not. In FIGS. 5A-5F, the driving side of the road is the right side, and north is toward the top of the page.

FIG. 5A illustrates an example diagram 500 of a cross-traffic turn route 502 through a 4-way intersection 504, including a graph section showing a node 506 representing intersection 504 and links representing the road segments into and out of intersection 504. The graph section shows route arrival link 508, route departure link 510, opposing traffic arrival link 512, and opposing traffic departure link 514, among other links entering or leaving the node.

In accordance with method 400, the compass heading of arrival link 508 is north, and the compass heading of departure link 510 is west, 90 degrees counterclockwise, indicating that the path 502 through the intersection 504 is a left turn. The "left" of the left turn does not match the "right" of the right side driving, and it is possible that the path 502 will cross oncoming traffic, so the compass headings of the other links are examined. The compass headings of opposing traffic arrival link 512 and opposing traffic departure link 514 are both south, which is opposite the north heading of arrival link 508. Route 502 is thus identified as crossing oncoming traffic—a cross-traffic turn.

FIG. 5B illustrates an example diagram 515 of a non-cross-traffic turn route 517 through a T-intersection 519, including a graph section showing a node 521 representing T-intersection 519 and links representing the road segments into and out of T-intersection 519. The graph section shows route arrival link 523, route departure link 525, and opposing traffic departure link 527, among other links entering or leaving the node. There is no opposing traffic arrival link, because no traffic enters intersection 519 in an opposite compass heading from that of route arrival link 523.

The compass heading of arrival link 523 is north, and the compass heading of departure link 525 is west, 90 degrees counterclockwise, indicating that the path 517 through the intersection 519 is a left turn. The "left" of the left turn does not match the "right" of the right side driving, and it is possible that the path 517 will cross oncoming traffic, so the compass headings of the other links are examined. While opposing traffic departure link 527 has a compass heading opposite the that of arrival link 523, there is no opposing traffic arrival link. Accordingly, route 517 is identified as not crossing oncoming traffic.

FIG. 5C illustrates an example diagram 530 of a cross-traffic turn route 532 through a 4-way intersection 534 with multiple travel lanes, including a graph section showing a node 536 representing intersection 534 and links representing the road segments into and out of intersection 534. The graph section shows route arrival link 538, route departure link 540, opposing traffic arrival link 542, and opposing traffic departure link 544, among other links entering or leaving the node.

No special considerations are needed for the multi-lane bi-directional street. Similar to example diagram 500 in FIG. 5A, the compass heading of arrival link 538 is north, and the compass heading of departure link 540 is west, 90 degrees counterclockwise, indicating that the path 532 through the intersection 534 is a left turn. The "left" of the left turn does not match the "right" of the right side driving, and it is possible that the path 532 will cross oncoming traffic, so the compass headings of the other links are examined. The compass headings of opposing traffic arrival link 542 and opposing traffic departure link 544 are both south, which is opposite the north heading of arrival link 538. Route 532 is thus identified as crossing oncoming traffic—a cross-traffic turn. Method 400 would also perform similarly if there are links representing each lane of the multi-lane bi-directional street, rather than links representing directions of traffic flow. For example, even if opposing traffic arrival link 542 and opposing traffic departure link 544 were doubled, method 400 would still identify a pair of opposing traffic arrival and departure links with headings opposite arrival link 538, leading to identification of a cross-traffic turn.

FIG. 5D illustrates an example diagram 545 of a non-cross-traffic turn route 547 through a 4-way intersection 549, including a graph section showing a node 551 representing intersection 549 and links representing the road segments into and out of intersection 549. The graph section shows route arrival link 553, route departure link 555, opposing traffic arrival link 557, and opposing traffic departure link 559, among other links entering or leaving the node.

The compass heading of arrival link 553 is north, and the compass heading of departure link 555 is east, 90 degrees clockwise, indicating that the path 547 through the intersection 549 is a right turn. The "right" of the right turn matches the "right" of the right side driving, so it is not possible that the path 547 will cross oncoming traffic. Route 547 is thus identified as not crossing oncoming traffic.

FIG. 5E illustrates an example diagram 560 of a cross-traffic turn route 562 through a T-intersection 564, including a graph section showing a node 566 representing intersection 564 and links representing the road segments into and out of intersection 564. The graph section shows route arrival link 568, route departure link 570, opposing traffic arrival link 572, and opposing traffic departure link 574, among other links entering or leaving the node.

T-intersection 564 differs from T-intersection 519 of FIG. 5B in the location of the arrival link 568 in relation to the other links. The compass heading of arrival link 568 is north, and the compass heading of departure link 570 is west, 90 degrees counterclockwise, indicating that the path 562 through the intersection 564 is a left turn. The "left" of the left turn does not match the "right" of the right side driving, and it is possible that the path 562 will cross oncoming traffic, so the compass headings of the other links are examined. The compass headings of opposing traffic arrival link 572 and opposing traffic departure link 574 are both south, which is opposite the north heading of arrival link 568. Route 562 is thus identified as crossing oncoming traffic—a cross-traffic turn. The absence of eastbound links had no effect on the determination.

FIG. 5F illustrates an example diagram 575 of a non-cross-traffic turn route 577 through an intersection 579 involving a one-way road, including a graph section showing a node 581 representing intersection 579 and links representing the road segments into and out of intersection 579. The graph section shows route arrival link 583 and route departure link 585 among other links entering or leaving the node. Because the road of arrival link 583 is a one-way road, there are no opposing traffic arrival or departure links.

The compass heading of arrival link 583 is north, and the compass heading of departure link 585 is west, 90 degrees counterclockwise, indicating that the path 577 through the intersection 579 is a left turn. The "left" of the left turn does not match the "right" of the right side driving, and it is possible that the path 577 will cross oncoming traffic, so the compass headings of the other links are examined. There are, however, no opposing traffic departure links or opposing traffic arrival links. Accordingly, route 577 is identified as not crossing oncoming traffic.

FIG. 5G illustrates an example diagram 590 of a cross-traffic U-turn route 591 through a 4-way intersection 592 with multiple travel lanes, including a graph section showing a node 593 representing intersection 592 and links representing the road segments into and out of intersection 592. The graph section shows route arrival link 594, opposing traffic arrival link 595, and joint route departure link and opposing traffic departure link 596, among other links entering or leaving the node.

The compass heading of route arrival link 594 is north, and the compass heading of joint route arrival link and opposing traffic departure link 596 is south. This is the special case indicating a U-turn. A U-turn may interfere with oncoming traffic and is therefore considered to be a cross-traffic turn. Route 591 is thus identified as a cross-traffic turn.

Referring again to method 300 in FIG. 3, at process block 320, the processor, in response to determining that that the path of the vehicle crosses oncoming traffic, adds an additional estimated delay for the departure link to a route objective function representing the vehicle route. (A further toll or crossing cost for the cross-traffic turn may also be applied as discussed herein to discourage the cross-traffic turn.)

In one embodiment, the shortest path solver (such as the Dijkstra algorithm) executed by route generation engine operates based (at least in part) on travel time, finding a path between nodes that is completed in the shortest time. Each link includes a travel time weight representing an expected amount of time to travel the road segment represented by the link from beginning intersection (represented by a "from" node of the link) to end intersection (represented by a "to" node of the link). The travel time is stored as a value in the link data structure. The travel time for the link may be a historical average of travel time derived from road source data for the link. The travel time may vary based on time of day and/or day of week that travel along the link occurs. For example, an expected travel time for the link may be provided for each hour of a day, and the processor will use the expected travel time for a time of day that the vehicle will travel along the link. This may be determined by adding the total travel time for the route under development at the time that it enters the link from a route start time at which the vehicle is to commence travel on the route.

In one embodiment, the objective function of a route or route segment is the cumulative cost (in one embodiment, expressed as a function of travel time, travel distance, cross-traffic turn delays, and cross-traffic turn hazard costs) of the links between an origin node and any given node in the graph. This objective function for a route to any given node may also be referred to as the cost of the node, or the cost to reach the node.

Where the processor determines that a vehicle's path through an intersection to reach a road segment represented by a link includes a turn across oncoming traffic, the processor adds an additional estimated delay to the estimated travel time for the link, increasing the expected amount of travel time along the link to account for the time to perform the cross-traffic turn. This additional estimated delay (a cost measured in time) is included in the objective function for all subsequent nodes following the link. The time added to the estimated travel time by the additional estimated delay may also serve to act as a discouragement against making even the low-risk, low-delay turns across light traffic. This discouragement is separate from tolls expressly added to the cost for the specific purpose of discouraging cross-traffic turns.

In one embodiment, in addition to determining, for the departure link, that the path of the vehicle from the arrival link to the departure link crosses oncoming traffic, the processor also determines whether the oncoming traffic is light or not light, and controls the additional estimated delay to be (i) a pre-configured standard delay where the oncoming traffic is light, and (ii) a dynamically generated measure of delay based on estimated traffic density where the oncoming traffic is not light, or heavy.

In one embodiment, the oncoming traffic is considered "light" or "residential" when daily traffic volume of the oncoming traffic is below a threshold of 1000 vehicles per day. On average, this is fewer than one oncoming vehicle per minute, allowing more than sufficient time to complete a cross-traffic turn, and is generally a satisfactory threshold. Higher or lower values for the threshold may also be selected, based on the expected time needed for a vehicle using the systems and methods herein to complete a turn across traffic, which may vary significantly based on the particular vehicle. For example, a tractor-trailer may require 15 seconds or more to complete a turn across traffic from a full stop, while a smaller delivery vehicle may take as few as 5 seconds to complete the same turn. In one embodiment, the processor may calculate or retrieve the traffic volume of the oncoming traffic, for example from road source data, and compare it with a threshold below which the traffic is considered light, and beyond which the traffic is considered non-light.

Alternatively, traffic may be inferred to be light or not light based on the position of the road represented by the opposing traffic link in a hierarchy of roads: links representing local streets are assumed to be "light" or "residential" traffic, while collectors and arterials are considered to be "non-light" or "non-residential traffic." Generally, limited-access freeways are not considered due to the prohibition against cross-traffic turns on such routes, but limited-access freeways would also be considered to have "non-light" or "non-residential" traffic. In one embodiment, the processor may retrieve the position of the road segment(s) carrying the oncoming traffic in the hierarchy of roads, for example from road source data, and determine that (i) the traffic is light if the road segments are local streets, and (ii) that the traffic is not light if the road segments are higher volume routes such as collectors, arterials, or limited-access freeways.

The results of these determinations as to whether or not the traffic along a road segment represented by a link is "residential" or "light" may be recorded as an indication in the data structure of the link. Thus, in one embodiment, the oncoming traffic is considered light based on an indication in one or more links that make up the oncoming traffic that the traffic of the one or more links is light. For example, there may be such an indication included in a data structure of the link, such setting the "residential" flag (described herein with reference to FIG. 2) for the link to a "true" value. The "residential" flag may also be set to a "false" value indicating that the traffic along the road segment represented by the link is "non-residential" or "non-light" (or heavy). The processor may execute a query on the graph to retrieve the value of the "residential" flag and accept the retrieved value as the determination as to whether or not the traffic of the link is considered "residential" or "light."

Once the processor has thus completed determining that the oncoming traffic is light, the processor then controls the additional estimated delay to be (i) a pre-configured standard delay where the oncoming traffic is light, and (ii) a dynamically generated measure of delay based on estimated traffic density where the oncoming traffic is not light, or heavy. In one embodiment, the processor controls the additional estimated delay by using different processes to select the additional estimated delay based on whether traffic is light or not light.

In one embodiment, the additional estimated delay for the departure link may be a pre-configured standard delay for cross-traffic turns that is received and stored by the system. For example, the processor may receive a value entered by an administrator of the system to be a standard delay, for example 30 seconds or 60 seconds. The processor stores that in storage or memory for later use. Then, when additional estimated delay is called for—when a residential cross-traffic turn is included in a route—the processor retrieves the value of the standard delay, and uses that value in calculations as the value of the additional estimated delay. Thus, in one embodiment, in response to determining that the oncoming traffic is light (or residential), the processor retrieves the pre-configured standard delay from memory and provides it as the additional estimated delay, thereby controlling the value of the additional estimated delay.

In one embodiment, the additional estimated delay for the departure link is calculated based at least in part on a historical speed and a speed limit for the oncoming traffic. For example, where the oncoming traffic is not light, a dynamically generated estimated delay for the heavier oncoming traffic is generated and applied. Observed historical speeds below the legal speed limit may indicate denser traffic, which increases the delay for a cross-traffic turn, while observed historical speeds at (or even above) the legal speed limit may indicate lighter traffic, which reduces the delay for a cross-traffic turn. Thus, the ratio of the observed speed to the legal speed limit may be used to modify a standard delay to more closely fit conditions at an intersection. For example, the processor may receive, store and retrieve a standard delay as discussed above. The processor may then divide the standard delay (D) by the ratio of the historical average speed (H) to legal speed limit (L) to produce an adjusted delay (A). Lower historical average speeds increase the adjusted delay, and higher historical average speeds reduce the adjusted delay. A positive multiplier (M) may optionally be applied to the ratio of H to L to change the magnitude of the effect of the ratio on the adjusted delay. In one embodiment, the processor executes Equation 1 to produce the adjusted delay:

$$A = \frac{D}{(H/L)M} \qquad \text{Eq. 1}$$

The processor retrieves the administrator-set values of D and M from storage. The processor retrieves the values of H and L from data structures associated with the opposing traffic departure links and/or opposing traffic arrival links. The processor then calculates the adjusted delay A. The adjusted delay A is therefore a dynamically generated measure of delay as a function of estimated traffic density. Thus, in one embodiment, in response to determining that the oncoming traffic is not light (or non-residential), the processor retrieves the values of pre-configured standard delay (D), historical average speed (H), legal speed limit (L), and multiplier (M) from memory, calculates adjusted delay (A) as described herein, and provides the adjusted delay as the additional estimated delay, thereby controlling the value of the additional estimated delay.

In one embodiment, the additional estimated delay for the departure link is calculated based at least in part historical traffic speeds for one or more links that make up oncoming traffic for a time of day at which the vehicle route arrives at the node. Historical traffic speeds may be broken down into a set of speeds for different blocks of time during a day, for example, into a set of 24 one-hour blocks. The processor thus, in one embodiment, determines a time of day at which the cross traffic turn will occur, and selects a value of H for a block that includes the time of day before calculating the value of A.

Once the processor has thus completed adding an additional estimated delay for the departure link to a route objective function representing the vehicle route in response to determining that that the path of the vehicle crosses oncomingtraffic, processing at process block 320 completes, and processing continues to process block 325.

In one embodiment, intersections may have multiple departure links that involve cross traffic turns. For example, there may be k-shaped intersections, in which two or more roads connect to the intersection on a single side of the intersection, or there may be intersections where more than four roads approach the intersection, forming a star-shaped intersection. Accordingly, in one embodiment, for each additional departure link that exits the node in addition to the departure link: the processor identifies the additional departure link as either having or lacking an exit path of the vehicle from the arrival link to the additional departure link that crosses light oncoming traffic; and adds an estimated delay for the additional departure link to a route objective function representing the vehicle route. For example, the processor identifies each exit link of the node in addition to the departure link, determines if the path to that link from the arrival link crosses oncoming traffic, and if so, whether that traffic is light, and finally, adds the estimated delay by retrieving the standard delay and either using it as the estimated delay, or using it to calculate an adjusted delay and using the adjusted delay as the estimated delay.

The additional delay incurred in paths with cross-traffic turns provides a baseline level of bias against cross-traffic turns. In one embodiment, a policy that further disfavors cross-traffic turns beyond the incurred delay can be incorporated into the operation of the systems and methods herein. Such a policy may be put in place to reduce the potential for traffic incidents inherent in cross-traffic turns. For example, a standard toll (or crossing cost) can be added to the objective function for each cross-traffic turn to make a route incorporating the cross-traffic turn more costly. The toll is not based on the cost of operating the vehicle along the road segment represented by the given link, but is a penalty imposed to discourage use of the road segment represented by the given link. As used herein, the toll is imposed as a crossing cost, or hazard penalty cost of making a cross-traffic turn into a given link. This toll, crossing cost, or penalty quantizes the extent to which the policy disfavors taking the cross-traffic turn. In one embodiment, the toll reflects an extent of hazard or risk of making the cross-traffic turn.

In one embodiment, in response to determining that that the path of the vehicle crosses oncoming traffic, the processor adds an additional cost for the departure link to the route objective function representing the vehicle route. The processor may make the determination that the vehicle crosses oncoming traffic as described herein with reference to adding the additional delay, for example as shown and described with reference to process blocks 310-320. The processor then retrieves a value for the toll from memory or storage, and uses that value as the toll. The value for the toll may be set by an administrator of the system. The higher the toll, the stronger the policy against cross-traffic turns is. The higher the toll, the less likely it is that a cross-traffic turn will be included in a shortest route from one node to another.

At process block 325, the processor selects, by the route generation engine, the route including the path that crosses oncoming traffic to be an optimum (least cost) route between a first location and a second location.

In one embodiment the processor determines that each node in the graph has been visited. This indicates to the processor that each route from the first location in the graph to each other location in the graph is optimal, involving the least cost in travel time to reach. In response, the processor then retains— stores for later retrieval and use—the routes, including the route including the path that crosses oncoming traffic. For example, the processor may write each route from the first location to another location in the graph to a data structure associated with the first location, such as in a routes to all nodes data structure in associated with the node representing the first location. The route including the path that crosses oncoming traffic begins with the first location, and ends at the second location, and is stored in a position associated with the second location in the routes to all nodes data structure.

In one embodiment, optimum or least-cost routes from a node to each other node in the graph are stored in each node of the graph. In one embodiment, the set of optimum or least-cost routes from each node to each other node of the graph are stored as a data structure in memory or storage. In one embodiment, the travel time for each route and the travel distance for each route are stored in association with the route as data structures in memory or storage. The least-cost routes may include one or more routes including residential cross-traffic turns.

Once the processor has thus completed selecting the route including the path that crosses oncoming traffic to be an optimum route between a first location and a second location by the route generation engine, processing at process block 325 completes, and processing continues to process block 330.

At process block 330, the processor includes, by a scheduling engine, the optimum route as part of a delivery schedule for the vehicle. In one embodiment scheduling engine 173 executes an MTSP solver. When executed by the processor, the MTSP solver accepts as inputs a set of delivery locations, a fleet of available delivery vehicles, the set of all routes from each node to each other node, and the travel times and travel distances associated with those routes. From these inputs, the MTSP solver generates a delivery schedule for the set of delivery locations.

In one embodiment, a delivery schedule describes which deliveries are delivered by which vehicles, and the order in which the vehicle makes the delivery. The delivery schedule describes a set of vehicle routes from a depot through a sequence of delivery locations and back to the depot that collectively visits (to make drop-off, pick-up, or otherwise service) each delivery location just once. The MTSP selects the optimal route from each node (representing the depot or delivery locations) to the next node for the assigned sequence of delivery locations from the set of optimum or least-cost routes from each node to each other node of the graph. Depending on the route selected, the MTSP may select a route including one or more residential cross-traffic turns.

The MTSP distributes the delivery locations (and the associated deliveries) among the vehicle routes in order to minimize a delivery objective function for the cost of deliveries across all vehicle routes. In one embodiment, the delivery objective function can represent one or more of travel distance, travel time, and financial cost. In one embodiment, the delivery objective function includes a weighted sum of travel distance and travel time. In one embodiment, the delivery objective function includes other weighted inputs, such as a vehicle loading time. Where the optimum route from delivery location to the next is a route with a residential cross-traffic turn, the processor thus includes that optimum route in the delivery schedule. The processor writes the completed delivery schedule to memory or storage.

The scheduling engine 173 may generate a load plan for a delivery vehicle based on the delivery route (of delivery locations) for the delivery vehicle, and include the load plan in the delivery schedule. The load plan includes at least a list of the delivery items to be delivered to the delivery locations. The load plan may also indicate an order in which the delivery items are loaded, making the delivery items accessible in the order in which they are scheduled to be delivered. The load plan may also specify locations within the delivery vehicle in which to place the delivery items.

In one embodiment, the schedule accommodates specific delivery time windows during which a delivery at a delivery location must occur. In one embodiment, the MTSP server may train and use a machine learning model to identify better delivery schedules based on the inputs.

Once the processor has thus completed including the optimum route as part of a delivery schedule for the vehicle by a scheduling engine, processing at process block 330 completes, and processing continues to process block 335.

At process block 335, the processor transmits the delivery schedule for execution. In one embodiment, the processor retrieves the delivery schedule, composes a message such as a REST request that includes the delivery schedule, and transmits the delivery schedule to a remote computer, such as computing devices 145, 155, 160, 161. In one embodiment, the message causes all of or a portion of the delivery schedule to be displayed on a graphical user interface of the remote computer. In one embodiment, the processor transmits the delivery route to a mobile device associated with the delivery vehicle to cause the delivery route to be displayed to the driver and cause the driver to operate the vehicle across the oncoming traffic. In one embodiment, the processor transmits the delivery schedule to handheld delivery information terminal 161 to display a vehicle route in a GPS navigation GUI, and present delivery item (e.g. package) information in a delivery terminal GUI.

In one embodiment, the processor transmits a load plan to a warehouse computing system for selection and loading of items to be delivered onto the delivery vehicle. In one embodiment, the transmission causes a user to manually execute loading instructions to place the proper delivery items on the vehicles. In another embodiment, the processor transmits the delivery schedule to a remote computer to automatically operate robotic loading equipment to execute the load plan.

In one embodiment, the delivery schedule is displayed along with input options approval, rejection, or modification of the delivery schedule by a user. Such user feedback may be used to train an ML model in the MTSP solver to generate better delivery schedules.

In one embodiment, the processor transmits the delivery schedule to an autonomous delivery vehicle to cause the autonomous delivery vehicle to proceed across the oncoming traffic to a delivery stop according to the delivery schedule. In one embodiment, the processor retrieves the delivery schedule, composes a message such as a REST request that includes all of or a portion of the delivery schedule, and an instruction to the autonomous delivery vehicle to execute the deliveries of a specific vehicle route included in the delivery schedule. In response to transmitting the delivery schedule to the autonomous delivery vehicle, these instructions cause the autonomous delivery vehicle to proceed across the oncoming traffic to a delivery stop according to the delivery schedule. In one embodiment, the systems and methods described herein operate the autonomous delivery vehicle to a delivery stop through the path of the vehicle from the arrival link to the departure link across the oncoming traffic by providing the autonomous vehicle with the delivery route and instruction to complete the deliveries along the route.

Once the processor has thus completed transmitting the delivery schedule for execution, processing at process block 335 completes, and processing continues to END block 340, where process 300 ends.

In one embodiment, method 300 depends on the availability of values that may not be present in either the graph or road source data for the graph. In one embodiment, a map enhancement module (such as map enhancement module 175) may generate these values for a graph from road source data and store them in the data structures of nodes and links in the map database. In one embodiment, the functions of the map enhancement module 175 are executed by a special purpose computing device (such as computing device 805) configured with dynamic cross-traffic turn vehicle route scheduling and navigation logic 830.

In one embodiment, for each link of the graph, the processor determines whether traffic along the link is light/residential or non-light/non-residential based on road source data (such as may be provided or updated from time to time by traffic/road data sources 195) and stores the determination of whether traffic along the link is light or non-light an indication in a data structure describing the link. In one embodiment, this determination is based on a road source data database separate from the graph. In one embodiment, the road source data is included in graph, for example in the link and node data structures.

In one embodiment, for each link of the graph, the processor retrieves a speed limit for the link from the road source data and stores the speed limit for the link in the data structure describing the link.

In one embodiment, for each link of the graph, the processor obtains beginning point coordinates and end point coordinates for the link, calculates a compass heading for the link from the beginning point coordinates and end point coordinates for the link; and stores the compass heading for the link in the data structure describing the link.

—Example Pseudocode—

In one embodiment, Dijkstra's algorithm is the shortest-path solver algorithm executed by route generation engine 170. At a high level, Dijkstra's algorithm operates by overestimating the cost to reach each other node of a graph from an origin node, and visiting each node and its neighbor nodes to see if there is a lower cost route segment (or subpath) to each neighbor node. Dijkstra's algorithm may be modified in accordance with the systems and methods herein to enable dynamic cost-weighting of a cross-traffic turn for inclusion in the least-cost route developed by the algorithm based on whether the oncoming traffic is light (or residential) or not. Pseudocode for an example implementation of Dijkstra's algorithm modified to enable dynamic inclusion of cross-traffic turns based on the heaviness of the oncoming traffic in vehicle routes is shown in Table 1:

TABLE 1

```
05    10    15    20    25    30    35    40    55    60    65    70
01  function Cross-Traffic Dijkstra(Graph, origin){
02      // begin initialization steps
03      for each node n in graph{
04          cost[n] = infinity;
05          travelTime [n] = infinity;
06          previous[n] = undefined;
07      }
08      cost[origin] = 0;
09      Q = the set of all nodes in Graph;
10      estimatedDelayTime = 30;
```

TABLE 1-continued

```
11      crossingCost = 0;
12      // end initialization steps
13
14      // begin main loop – find minimum travel cost with
15      // light cross-traffic turns permitted, and heavy cross-
16      // traffic turns permitted but dynamically discouraged
17      while Q is not empty{
18          u = node in Q with smallest cost[ ];
19          remove u from Q;
20          for each unvisited neighbor n of u{
21              if path through u to n is cross-traffic turn{
22                  if cross-traffic is light{
23                      tempCost = cost[u] + travelBetween(u,n)
24                          + estimatedDelayTime + crossingCost;
25                      if tempCost < cost[n]{
26                          cost[n] = tempCost;
27                          travelTime[n] = travelTime[u]
28                              + travelBetween(u,n)
29                              + estimatedDelayTime;
30                          previous[n]= u;
31                      }
32                  }
33                  // where cross-traffic is not light
34                  // compute and add a "cost" as a function of
35                  // estimated traffic density
36                  else{
37                      tempCost = cost[u] + travelBetween(u,n)
38                          + estimatedDelayTime
39                          + crossingCost
40                          + densityCost(estimatedDelayTime,u);
41                          // See Eq. 1 for example densityCost( ) function
42                      if tempCost < cost[n]{
43                          cost[n] = tempCost;
44                          travelTime[n] = travelTime[u] + travelBetween(u,n)
45                              + estimatedDelayTime;
46                          previous[n] = u;
47                      }
48                  }
49              }
50              else{
51                  tempCost = cost[u] + travelBetween(u,n);
52                  if tempCost < cost[n]{
53                      cost[n] = tempCost;
54                      travelTime[n] = travelTime[u] + travelBetween(u,n);
55                      previous[n] = u;
56                  }
57              }
58          }
59      }
60      //end main loop
61
62      return previous[ ];
63  }
        05    10    15    20    25    30    35    40    55    60    65    70
```

The algorithm of Table 1 finds the lowest objective cost route or path from an origin node to each other node in a graph, where cross-traffic turns are dynamically included in the route where oncoming traffic is light, and dynamically disfavored where oncoming traffic is not light as a function of traffic density, and still included in the route where there is no lower objective cost solution. The "cost" is not a financial cost, but is an measure of burden for travel between geographic locations used to find a "most acceptable" route that considers factors such as travel time, travel distance, and the extent to which a cross-traffic turn is disfavored. In one embodiment, the cost is expressed in terms of time, with hazard costs for cross traffic turns expressed in terms of time, even though they represent a factor—risk of collision—other than travel time.

Lines 03-11 of Table 1 include initialization steps for the algorithm of Table 1. At lines 03-07, for each node (n) in the graph, the cost to reach the node from the origin (cost[n], also referred to herein as the cost of a node) is initialized to be infinite, the travel time to reach the node from the origin (travelTime[n]) is initialized to be infinite, and the previous node in the optimal path from the origin to the node (previous[n]) is set to be undefined. At line 08, the cost to reach the origin (cost[origin]) is set to zero, because there is no cost to reach the origin when already at the origin. At line 09, the set of all nodes in the graph is placed in an array Q, the set of unexamined nodes in the graph. At line 10, a constant estimated delay time for a residential/light traffic cross traffic turn (estimatedDelayTime) is set. In one embodiment, this is an average delay time for all residential cross-traffic turns based on observed delay time for historical residential cross-traffic turns. In one example, the estimated delay time may be, for example, 30 seconds, as shown at line 10. At line 10, an additional toll constant (crossingCost) is set. This toll is an additional cost representing an extent to which administrators of the system wish to discourage cross-traffic turns generally. In the example of Table 1, the toll is set to 0, indicating no discouragement of residential cross-traffic turns. Increases in the toll level indicate higher levels of discouragement for residential cross-traffic turns. In one embodiment, the estimated delay cost and/or toll may vary based on time of day that the turn is occurring. This may be based on elapsed travel time to reach a node from a start time for the route.

Lines 17-60 of Table 1 are a while loop for examining all nodes in the graph, which repeats while there are still unexamined nodes in Q. At lines 18 and 19, a current node under consideration (u) is extracted from the set of unexamined nodes Q. The current node under consideration is the node in the smallest cost. Thus, in the first iteration of the while the first node extracted from Q will be the origin node, because it has a cost of 0, while all other nodes have infinite costs. At lines 20-59, for each unvisited neighbor node (n) of the current node under consideration (u), the processor determines whether the path through u to n is a cross-traffic turn, for example as shown and described herein with reference to FIG. 4. If the path through u to n is a cross-traffic turn, lines 22-50 will be executed. If the path through u to n is not a cross-traffic turn, the else case at lines 51-58 will be executed.

Where the path through u to n is a cross-traffic turn, at line 22, it is determined whether the cross traffic is light, or not. Where the cross traffic is light, at lines 23-24 a temporary cost (tempCost) is calculated, which is the sum of the cost of the current node under consideration (cost[u]), the travel time to reach n from u (travelBetween(u,n)), the estimated delay time (estimatedDelayTime), and the toll (crossingCost). At line 25, the temporary cost (tempCost) is compared to the cost of neighbor node n (cost[n]). If the temporary cost (tempCost) is less than the cost of neighbor node n (cost[n]), then (i) at line 26 the cost of neighbor node n (cost[n]) is replaced by the smaller temporary cost (tempCost); (ii) at lines 27-29 travel time to neighbor node n (travelTime[n]) is set to the sum of the travel time to reach current node u (travelTime[u]), the travel time between current node u and neighbor node n (travelBetween(u,n)) and the estimated delay time (estimatedDelayTime); and (iii) at line 30 the previous node in the path to reach neighbor node (n) is set to be current node under consideration (u). Where the cross traffic is not light, at lines 37-40, a temporary cost (tempCost) is calculated, which is the sum of the cost to reach the current node under consideration (cost[u]), the travel time to reach n from u (travelBetween(u,n)), the estimated delay time (estimatedDelayTime), the toll (crossingCost), and a dynamically-generated traffic density cost (densityCost( )). At line 42, the temporary cost (tempCost) is compared to the cost of neighbor node n (cost[n]). If the temporary cost (tempCost) is less than the cost of neighbor node n (cost[n]), then (i) at line 43 the cost of neighbor node n (cost[n]) is replaced by the smaller temporary cost (tempCost); (ii) at lines 44-46 travel time to neighbor node n (travelTime[n]) is set to the sum of the travel time to reach current node u (travelTime[u]), the travel time between current node u and neighbor node n (travelBetween(u,n)), and the estimated delay time (estimatedDelayTime); and (iii) at line 47 the previous node in the path to reach neighbor node (n) is set to be current node under consideration (u). In one embodiment, the density cost is a function of estimated traffic density at the intersection represented by the current node (u), for example as shown and described herein with reference to Eq. 1.

Where the path through u to n is not a cross-traffic turn—for example, proceeding directly through the intersection or making a turn that does not cross traffic—at line 52, a temporary cost (tempCost) is calculated, which is the sum of the cost of the current node under consideration (cost[u]), the travel time to reach n from u (travelBetween (u,n)). At line 53, the temporary cost (tempCost) is compared to the cost of neighbor node n (cost[n]). If the temporary cost (tempCost) is less than the cost of neighbor node n (cost[n]), then (i) at line 54, the cost of neighbor node n (cost[n]) is replaced by the smaller temporary cost (tempCost); (ii) at line 55 the travel time to reach time to neighbor node n (travelTime[n]) is set to the sum of the travel time to reach current node u (travelTime[u]) and the travel time between current node u and neighbor node n (travelBetween (u,n)); and (iii) at line 56, the previous node in the path to reach neighbor node (n) is set to be current node under consideration (u).

Once the set of unexamined nodes Q is exhausted and each node in the graph is examined, the while loop terminates, and at line 63, the set of all previous nodes (or antecessors) for the nodes of the graph is returned. From this set of previous nodes, the set of least costly (optimal) routes from the origin to all other nodes of the graph can be assembled. Further, the cost to reach each node of the graph is recorded, including any estimated delay cost and/or toll imposed for including a residential cross-traffic turn. No potential routes are pruned—Non-residential (or heavy) cross-traffic are considered as potential routes. The final route is selected on the basis of least cost, and may include light traffic or even heavy traffic cross-traffic turns, where such a turn is included in the lowest-cost route. Additional metrics of the route to a node may also be recorded. For example, regardless of the basis of the cost function in the algorithm, both the total travel time of a route and the total distance of a route may be recorded. The least costly routes to all other nodes of the graph and the associated costs, travel times, and distances of the routes may be stored as data structure(s) associated with the data structure of the origin node. In one embodiment, the algorithm of Table 1 is executed for each node of the graph being set to be the origin, thereby developing a complete set of least costly routes from each node to each other node of the graph. The set of least costly routes, and their associated costs, travel times, and distances, are thereby available for retrieval and use by a multiple traveling salesman solver/optimizer, such as that executed by scheduling engine 173. In one embodiment, scheduling engine 173 employs continuous optimization using simulated annealing—approximating a globally optimal set of routes within the map by probabilistically selecting between alternative variations on the schedule based on the objective function of the routes and a gradually decreasing annealing parameter.

—Selected Advantages—

The system and methods described herein Improved safety for traveling routes with cross-traffic turns.

One challenge overcome here is particular to the utilization of graph representations of road networks for digital navigation and routing. These graphs do not include information to evaluate whether a cross-traffic turn is appropriate. For example, graph representations of road networks that do not indicate what side of the road traffic from an arriving link is on. The system and methods described herein allows cross-traffic turn evaluations in graph representations of road networks that do not indicate what side of the road traffic from an arriving link is on. This enables a computer to evaluate the viability of cross-traffic turns in view of the nature of oncoming traffic—and whether or not to include the cross-traffic turns in travel routes—where it was not previously possible for a computer to do so. The systems and methods herein thus improve the technology of digital navigation by enabling conditional, dynamic evaluation of cross-traffic turns when routing vehicles.

Further, by generally allowing cross-traffic turns when traffic is light with a nominal, standard delay, and dynamically generating a measure of delay to apply to cross-traffic turns where traffic is heavier, safety is maintained at the same level, excessive cross-traffic turns are avoided, increasing safety in the same manner as implementation of a "hard" no-cross-traffic-turns rule, while enabling more diverse routing options to a vehicle than offered by a "hard" no-cross-traffic-turns rule. This enables the system to attain similar safety benefits while still making available faster routes that include occasional cross-traffic turns.

—Software Module Embodiments—

In general, software instructions are designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, the present system (such as scheduling, dispatch, and routing system 105) is a computing/data processing system including a computing application or collection of distributed computing applications for access and use by other client computing devices associated with an enterprise (such as the client devices 145, 150, 155, 160, 161, and 165 of enterprise network 115) that communicate with the present system over a network (such as network 110). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions.

—Autonomous Vehicle Embodiment—

Figure 6:
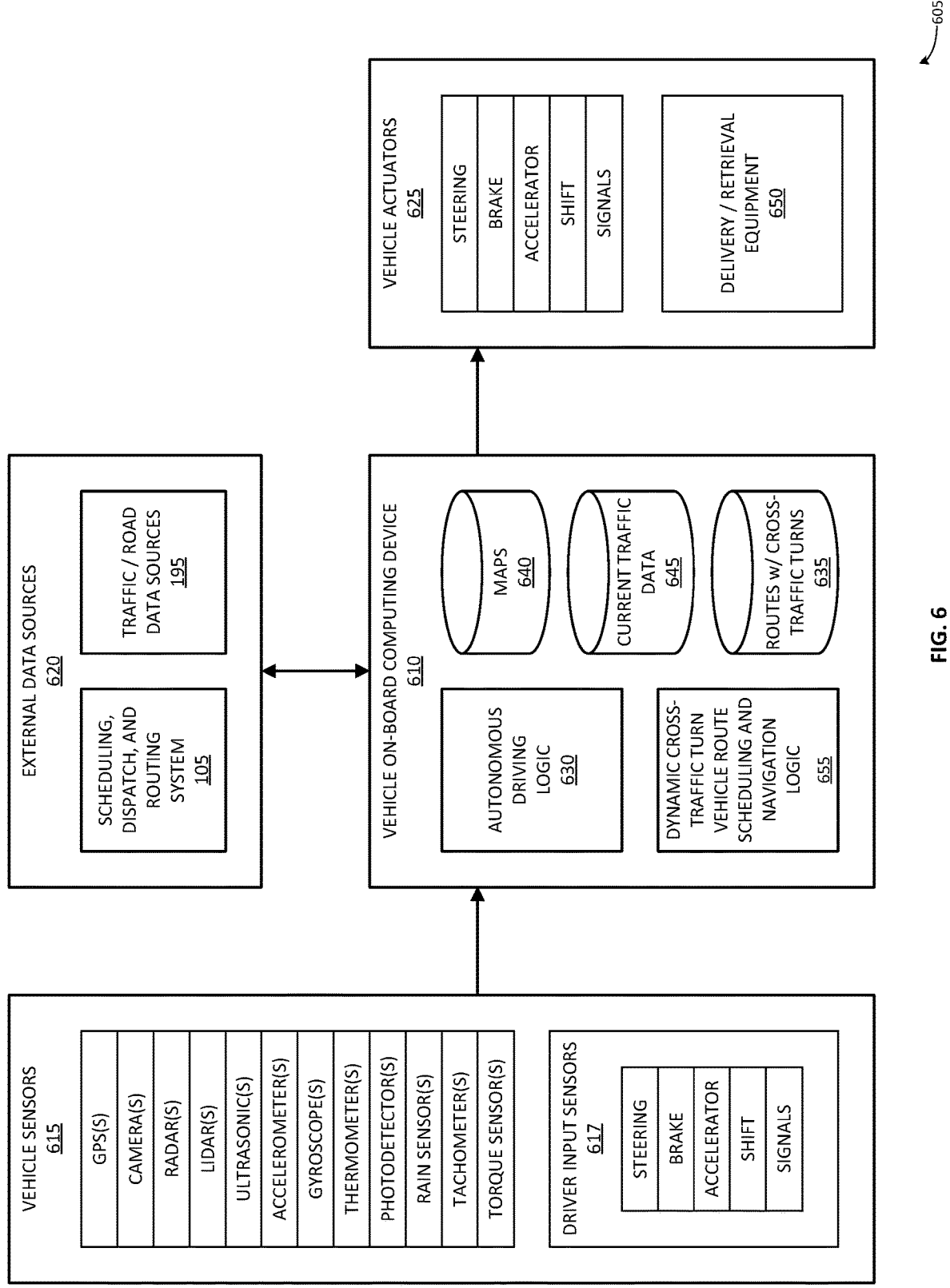
FIG. 6 illustrates an example autonomous vehicle control system that is configured and/or programmed to operate in accordance with one or more of the systems and methods described herein, and/or equivalents.

FIG. 6 illustrates an example autonomous vehicle control system 605 that is configured and/or programmed to operate in accordance with one or more of the systems and methods described herein, and/or equivalents. Autonomous vehicle 165 may be operated by autonomous vehicle control system 605. In one embodiment, autonomous vehicle control system 605 includes a vehicle on-board computing device 610, such as example computing system 800, operably connected to the systems of autonomous vehicle 165. In one embodiment, autonomous vehicle control system 605 includes vehicle sensors 615. Vehicle sensors may include global positioning system (GPS) receivers, monocular or binocular cameras, radar sensors, lidar sensors, ultrasonic sensors, accelerometers, gyroscopes, thermometers, photodetectors, rain sensors, tachometers to determine wheel speed, wheel slippage, and/or vehicle speed, torque sensors, and driver input sensors 617. Driver input sensors 617 include sensors to detect driver input to steering, brake, accelerator, shift, or signaling systems. Autonomous vehicle control system 605 may access external data sources 620, such as scheduling, dispatch, and routing system 105 and traffic/road data sources 195 through wireless or (intermittently) wired communications networks, such as network 110. Autonomous vehicle control system 605 includes vehicle actuators 625, which are configured to cause the motion or other actions of autonomous vehicle 165 in response to control by autonomous driving logic 630.

Autonomous driving logic 630 retrieves or accepts routes with cross-traffic turns 635 generated in accordance with the systems and methods described herein, a map 640, and inputs from vehicle sensors 615 and sends control signals to vehicle actuators 625 to control, guide, or operate the autonomous vehicle 165 along the routes through cross traffic turns to one or more destinations. Additionally, autonomous driving logic 630 retrieves or accepts current traffic data 645 to inform its control decisions. Routes with cross traffic turns 635 may include a delivery schedule of destinations along a route. Routes 635, maps 640, and traffic data may be retrieved continuously or at intervals by vehicle on-board computing device 610 from external data sources 620, and stored as local data structures vehicle on-board computing device 610 for rapid access by autonomous driving logic 630.

Autonomous vehicles such as autonomous vehicle 165 may be full-sized, street-legal vehicles, or may be compact vehicles configured for travel along sidewalks. In one embodiment, autonomous vehicle 165 may be equipped with delivery/retrieval equipment 650 which may be used to deposit a delivery, grant access to a delivery, accept a delivery, or retrieve a delivery. Delivery/retrieval equipment 650 may be caused to operate by vehicle actuators 625, in response to control signals sent by autonomous driving logic. Delivery/retrieval equipment 650 may include automatically operated doors configured to allow delivery items such as packages to pass into and out of autonomous vehicle 165, and robotic arms and conveyor devices configured to grasp and/or maneuver delivery items into and out of autonomous vehicle 165. Delivery/retrieval equipment 650 may be used to load delivery items before traveling along a route with cross-traffic turns, or to complete a delivery after traveling along a route with cross-traffic turns.

In one embodiment, vehicle on-board computing device 610 is configured to perform the methods described herein to generate routes with cross-traffic turns 635, such as method 300 or method 400, by dynamic cross-traffic turn vehicle route scheduling and navigation logic 655. Vehicle on-board computing device 610 may do so in response to being provided with a list or schedule of one or more destinations for delivery or pick-up of items. Alternatively, pre-generated routes with cross-traffic turns 635 may be provided directly from the scheduling, dispatch, and routing system 105. In one embodiment, the list of destinations, or the routes 635, may be provided to vehicle on-board computing device 610 over wireless networks while autonomous vehicle 165 is away from a "home base" location, which may be especially useful for item pickup activity.

The risk of collision to autonomous vehicles that are permitted to make cross-traffic turns is significantly reduced by implementing the systems and methods herein because the routes developed only include left hand turns that are safer, low-risk turns in light traffic. Cross-traffic turns in heavy traffic are avoided.

—Mobile Device Embodiment—

Figure 7:
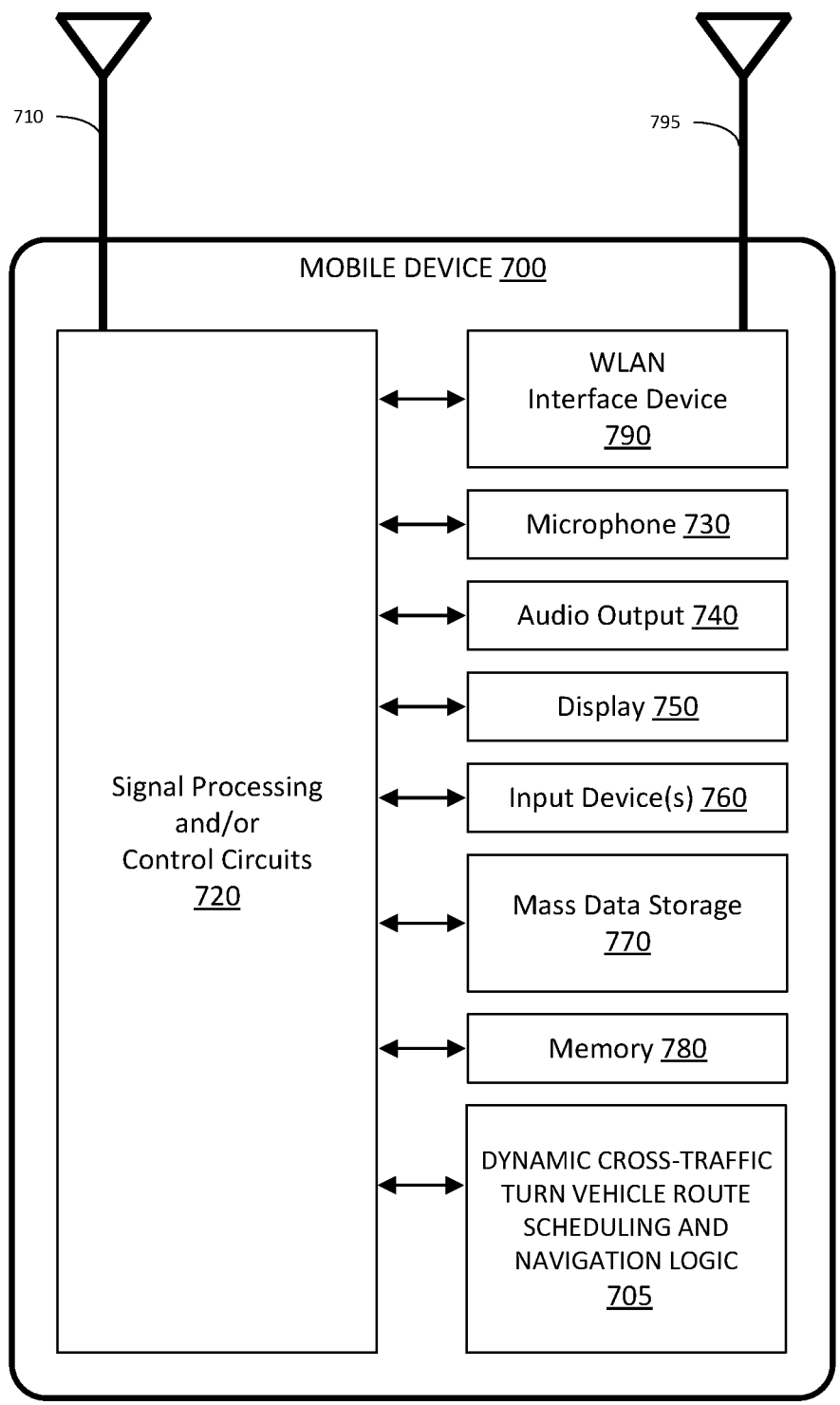
FIG. 7 illustrates an example mobile device that is configured and/or programmed with one or more of the systems and methods described herein, and/or equivalents.

Referring now to FIG. 7, illustrates an example mobile device 700 that is configured and/or programmed with one or more of the systems and methods described herein, and/or equivalents. In one example, the mobile device 700 may include dynamic cross-traffic turn vehicle route scheduling and navigation logic 705 configured to facilitate vehicle route scheduling and navigation with dynamic selection of turns across opposing traffic similar to the logic, system, and methods shown and described with reference to shown in FIGS. 1 through 6. Mobile device 700 may include a cellular antenna 710. The example embodiment may implement signal processing and/or control circuits, which are generally identified in FIG. 7 at 720. In some implementations, the mobile device 700 includes a microphone 730, an audio output 740 such as a speaker and/or audio output jack, a display 750 and/or an input device 760 such as a keypad, pointing device, touch screen, voice actuation and/or other input devices. The signal processing and/or control circuits 720 and/or other circuits (not shown) in the mobile device 700 may process data, perform coding and/or encryption, perform calculations, format data and/or perform other cellular phone functions.

The mobile device 700 may communicate with a mass data storage 770 that stores data in a nonvolatile manner such as in optical and/or magnetic storage devices including, for example, HDDs and/or DVDs. The HDD may be a mini HDD that includes one or more platters having a diameter that is smaller than approximately 1.8 inches. The cellular phone 700 may be connected to a memory 780 such as RAM, ROM, low latency nonvolatile memory such as flash memory and/or other suitable electronic data storage. The mobile device 700 also may support connections with a WLAN via a WLAN network interface 790. Mobile device 700 may include a WLAN antenna 795. In this example embodiment, example systems and methods may be implemented using this WLAN network interface 790, but other arrangements are also possible.

In one embodiment, the mobile device 700 may be a handheld delivery information terminal, and include additional hardware components such as a bar/QR/other code scanning device, signature input device, and GPS receiver. The mobile device 700 configured as a handheld delivery terminal may include specialized software for presenting delivery information, such as a schedule of orders for delivery, pickup, or service at a particular location, and order details on display 750. The mobile device 700 configured as a handheld delivery terminal may include specialized GPS navigation software for presenting the route between the locations on the schedule on display 750 to guide the user from one delivery, pickup, or service location to the next.

—Computing Device Embodiments—

Figure 8:
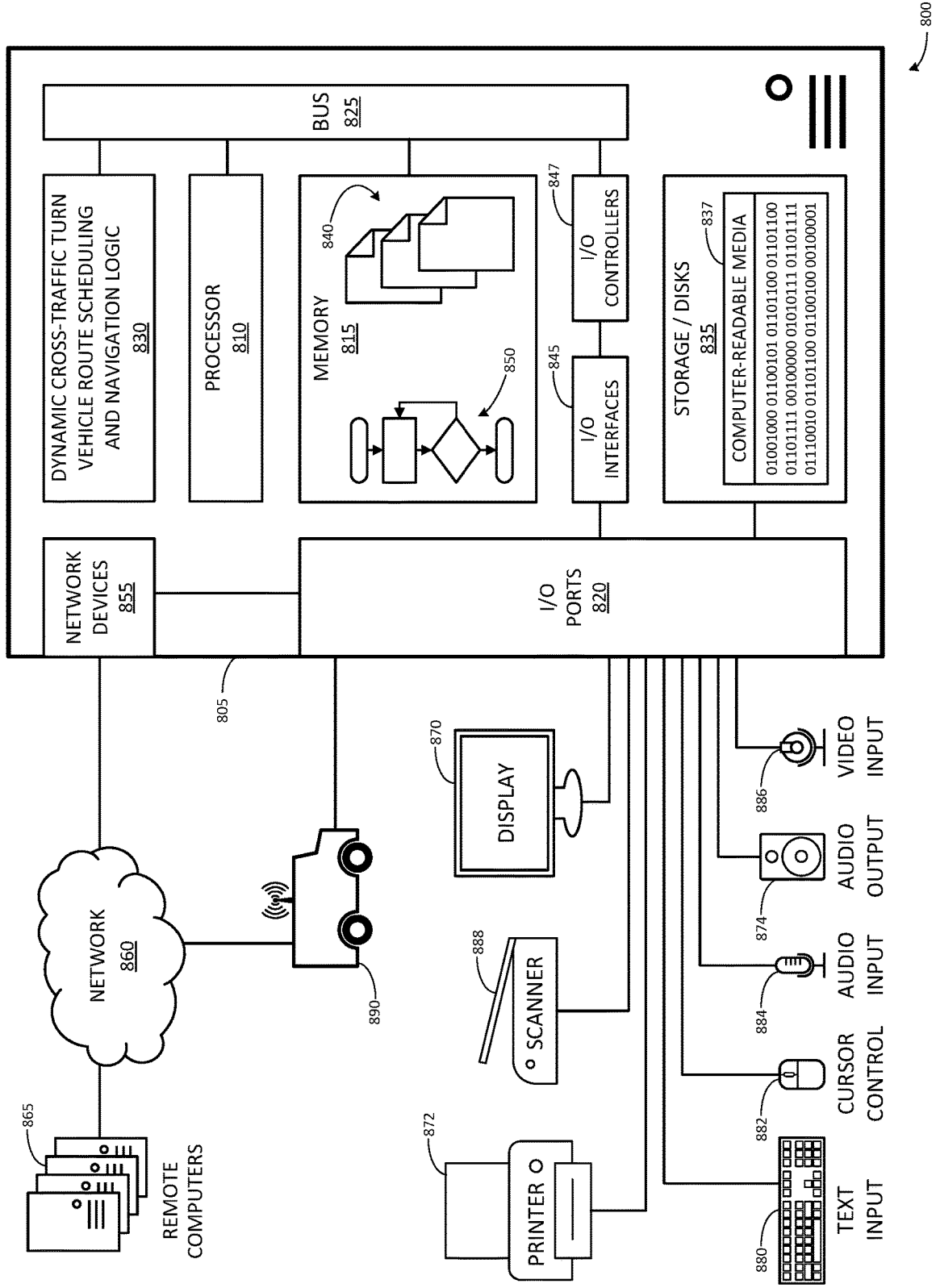
FIG. 8 illustrates an example computing system that is configured and/or programmed as a special purpose computing device with one or more of the example systems and methods described herein, and/or equivalents.

FIG. 8 illustrates an example computing system 800 that is configured and/or programmed as a special purpose computing device with one or more of the example systems and methods described herein, and/or equivalents. The example computing device may be a computer 805 that includes a processor 810, a memory 815, and input/output ports 820 operably connected by a bus 825. In one example, the computer 805 may include dynamic cross-traffic turn vehicle route scheduling and navigation logic 830 configured to facilitate vehicle route scheduling and navigation with dynamic selection of turns across opposing traffic similar to the logic, systems, and methods shown and described with reference to FIGS. 1-6. In different examples, the dynamic cross-traffic turn vehicle route scheduling and navigation logic 830 may be implemented in hardware, a non-transitory computer-readable medium with stored instructions, firmware, and/or combinations thereof. While the dynamic cross-traffic turn vehicle route scheduling and navigation logic 830 is illustrated as a hardware component attached to the bus 825, it is to be appreciated that in other embodiments, the dynamic cross-traffic turn vehicle route scheduling and navigation logic 830 could be implemented in the processor 810, stored in memory 815, or stored in disk 835 on computer-readable media 837.

In one embodiment, dynamic cross-traffic turn vehicle route scheduling and navigation logic 830 or the computing system 800 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform vehicle route scheduling and navigation with dynamic selection of turns across opposing traffic as shown and described herein. The means may also be implemented as stored computer executable instructions that are presented to computer 805 as data 840 that are temporarily stored in memory 815 and then executed by processor 810.

Dynamic cross-traffic turn vehicle route scheduling and navigation logic 830 may also provide means (e.g., hardware, non-transitory computer-readable medium that stores executable instructions, firmware) for performing vehicle route scheduling and navigation with dynamic selection of turns across opposing traffic.

Generally describing an example configuration of the computer 805, the processor 810 may be a variety of various processors including dual microprocessor and other multiprocessor architectures. A memory 81015 may include volatile memory and/or non-volatile memory. Non-volatile memory may include, for example, ROM, PROM, EPROM, EEPROM, and so on. Volatile memory may include, for example, RAM, SRAM, DRAM, and so on. A storage disk 835 may be operably connected to the computer 805 by way of, for example, an input/output (I/O) interface (for example, a card or device) 845 and an input/output port 820 that are controlled by at least an input/output (I/O) controller 847. The disk 835 may be, for example, a magnetic disk drive, a solid-state disk drive, a floppy disk drive, a tape drive, a Zip drive, a flash memory card, a memory stick, and so on. Furthermore, the disk 835 may be a CD-ROM drive, a CD-R drive, a CD-RW drive, a DVD ROM, and so on. The memory 815 can store a process 850 and/or data 840 formatted as one or more data structures, for example. The disk 835 and/or the memory 815 can store an operating system that controls and allocates resources of the computer 805. The computer 805 may interact with, control, and/or be controlled by input/output (I/O) devices via the input/output (I/O) controller 847, the I/O interfaces 845 and the input/output ports 820. The input/output devices include one or more displays 870, printers 872 (such as inkjet, laser, or 3D printers), and audio output devices 874 (such as speakers or headphones), text input devices 880 (such as keyboards), a pointing and selection device 882 (such as mice, trackballs, touchpads, touch screens, joysticks, pointing sticks, stylus mice), audio input devices 884 (such as microphones), video input devices 886 (such as video and still cameras), video cards (not shown), disk 835, network devices 855, autonomous vehicles 890, internet of things sensors (not shown), and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865, remote mobile devices, or remote computer-controllable hardware, such as autonomous vehicles 890. Networks with which the computer 805 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

[0162] ASIC: application specific integrated circuit.
[0163] CD: compact disk.
[0164] CD-R: CD recordable.
[0165] CD-RW: CD rewriteable.
[0166] CPU: central processing unit.
[0167] DVD: digital versatile disk and/or digital video disk.
[0168] GPS: global positioning system.
[0169] GPU: graphics processing unit.
[0170] HDD: hard disk drive.
[0171] HTTP: hypertext transfer protocol.
[0172] IAAS: infrastructure-as-a-service.
[0173] LAN: local area network.
[0174] MTSP: multiple travelling salesman problem.
[0175] PAAS: platform-as-a-service.
[0176] PCI: peripheral component interconnect
[0177] PCIE: PCI express.
[0178] RAM: random access memory.
[0179] DRAM: dynamic RAM.
[0180] SAAS: software-as-a-service.
[0181] SRAM: synchronous RAM.
[0182] ROM: read only memory.
[0183] PROM: programmable ROM.
[0184] EPROM: erasable PROM.
[0185] EEPROM: electrically erasable PROM.
[0186] SQL: structured query language.
[0187] OQL: object query language.
[0188] USB: universal serial bus.
[0189] XML: extensible markup language.
[0190] WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:

access a graph representing a road network, wherein nodes of the graph are data structures that represent a geographical location where a turn may be made, wherein links of the graph are data structures that represent a traffic route between nodes, and wherein a compass heading for a link is calculated from first coordinates of a first node that is at a beginning point of the link and second coordinates of a second node that is at an end point of the link;

develop a vehicle route from an origin node to a destination node in the graph, wherein cross-traffic turns are dynamically discouraged from inclusion in the vehicle route as a function of traffic density where oncoming traffic is not light, wherein the vehicle route is developed by, for one or more of the nodes in the graph:

determining, for neighbor nodes of one of the nodes in the graph, a departure link, that a path of a vehicle through the node from an arrival link to a departure link to the neighbor node crosses oncoming traffic by (i) determining that a compass heading of the arrival link and a compass heading of the departure link indicate that the path is a turn in a direction opposite a driving side of a road that is applicable to the graph, and (ii) determining that there is oncoming traffic through the node where a first compass heading of a first link entering the node and of a first link exiting the node is opposite the compass heading of the arrival link; and in response to determining that the path of the vehicle to the neighbor node crosses the oncoming traffic:

determining that the oncoming traffic is not light where the first link is indicated not to be residential, in response to determining that the oncoming traffic is not light, generating an estimated delay for the departure link to the neighbor node, wherein the estimated delay increases as a function of density of the oncoming traffic, and assigning the neighbor node to have a cost that combines the cost to reach the node from the origin node and the estimated delay when the cost is less than a previous cost assigned to the neighbor node;

select as the vehicle route a route from the origin node to the destination node that has a lowest total cost;

include the vehicle route as part of a delivery schedule for the vehicle;
transmit the delivery schedule to a delivery information terminal for execution; and
display the vehicle route in a GPS navigation GUI of the delivery information terminal.

2. The non-transitory computer-readable medium of claim 1, wherein the instructions further cause the computer to:
determine that the oncoming traffic is light where the first link is indicated to be residential; and
control the estimated delay to be a pre-configured standard delay where the oncoming traffic is light.

3. The non-transitory computer-readable medium of claim 1, wherein the instructions that cause the computer to generate an estimated delay for the departure link include instructions that cause the computer to estimate the density of the oncoming traffic based on a historical speed and a speed limit for the oncoming traffic.

4. The non-transitory computer-readable medium of claim 1, wherein the instructions further cause the computer to, for each link of the graph:
determine whether traffic along the link is light or non-light based on road source data;
store the determination of whether traffic along the link is light or non-light as an indication in a data structure describing the link;
retrieve a speed limit for the link from the road source data; and
store the speed limit for the link in the data structure describing the link.

5. The non-transitory computer-readable medium of claim 1, wherein the instructions to transmit the delivery schedule for execution includes instructions to:
transmit a load plan to a warehouse computing system for selection and loading of items to be delivered onto a delivery vehicle, wherein the load plan indicates an order in which the items are loaded that makes the items accessible in the order of the vehicle route.

6. The non-transitory computer-readable medium of claim 1, wherein the instructions further cause the computer to:
display input options for approval, rejection, or modification of the delivery schedule in the GPS navigation GUI;
accept user feedback through the input options; and
train an ML model to generate delivery schedules based on the user feedback.

7. A computer-implemented method, comprising:
accessing a graph representing a road network, wherein nodes of the graph are data structures that represent a geographical location where a turn may be made, wherein links of the graph are data structures that represent a traffic route between nodes, and wherein a compass heading for a link is calculated from first coordinates of a first node that is at a beginning point of the link and second coordinates of a second node that is at an end point of the link;
developing a vehicle route from an origin node to a destination node in the graph, wherein cross-traffic turns are dynamically discouraged from inclusion in the vehicle route as a function of traffic density where oncoming traffic is heavy, wherein the vehicle route is developed by, for one or more of the nodes in the graph:
determining, for neighbor nodes of one of the nodes in the graph, that a path of a vehicle through the node from an arrival link to a departure link to the neighbor node crosses oncoming traffic,
in response to determining that the path of the vehicle to the neighbor node crosses the oncoming traffic, determining that the oncoming traffic is heavy,
in response to determining that the oncoming traffic is heavy, generating an estimated delay for the departure link to the neighbor node, wherein the estimated delay increases as a function of density of the oncoming traffic,
assigning the neighbor node to have a cost that is the lesser of a previous cost assigned to the neighbor node and a cost that combines a cumulative cost to reach the node from the origin node and the estimated delay, and
selecting as the vehicle route a route from the origin node to the destination node that has a lowest total cost;
including the vehicle route as part of a delivery schedule for the vehicle; and
transmitting the delivery schedule for execution.

8. The computer-implemented method of claim 7, wherein determining, for the departure link, that the path of the vehicle from the arrival link to the departure link crosses oncoming traffic comprises:
retrieving an indication of a driving side of a road applicable to the graph;
retrieving the compass heading of each incoming and outgoing link with the node, including the arrival link and departure link;
determining that the compass heading of the arrival link and the compass heading of the departure link indicate that the path is a turn in a direction opposite the driving side of the road; and
determining that a first compass heading of a first link entering the node and of a first link exiting the node is opposite the compass heading of the arrival link.

9. The computer-implemented method of claim 7, further comprising:
determining that the oncoming traffic is light where the first link is indicated to be residential; and
controlling the estimated delay to be a pre-configured standard delay where the oncoming traffic is light;
wherein the oncoming traffic is considered light based on an indication in one or more links that make up the oncoming traffic that the traffic of the one or more links is light.

10. The computer-implemented method of claim 7, wherein generating an estimated delay for the departure link comprises calculating the estimated delay based at least in part on historical traffic speeds for one or more links that make up oncoming traffic for a time of day at which the vehicle route arrives at the node.

11. The computer-implemented method of claim 7, further comprising for each link of the graph:
determining whether traffic along the link is light or heavy based on road source data;
storing the determination of whether traffic along the link is light or heavy as an indication in a data structure describing the link;
retrieving a speed limit for the link from the road source data; and
storing the speed limit for the link in the data structure describing the link.

12. The computer-implemented method of claim 7, further comprising operating an autonomous delivery vehicle to a delivery stop through the path of the autonomous delivery vehicle from the arrival link to the departure link across the oncoming traffic.

13. The computer-implemented method of claim 7, wherein determining, for the departure link, that the path of the vehicle from the arrival link to the departure link crosses oncoming traffic comprises:
retrieving the compass heading of the arrival link and the compass heading of the departure link;
determining that the path is a U-turn where the compass heading of the arrival link and the compass heading of the departure link are approximately opposite each other; and
dynamically discourage the U-turn as a cross-traffic turn.

14. The computer-implemented method of claim 7, wherein the estimated delay is generated based on adjusting a pre-configured standard delay by ratio of a historical average speed to a legal speed limit of the oncoming traffic.

15. The computer-implemented method of claim 7, further comprising initializing the costs for the nodes of the graph to be a large value, and then initializing the cost for the origin node to zero.

16. The computer-implemented method of claim 7, wherein costs are assigned to each of the nodes in the graph during the developing of the vehicle route.

17. A computing system comprising:
a processor;
a memory operably connected to the processor;
an autonomous vehicle operated by an autonomous vehicle control system;
a non-transitory computer-readable medium operably connected to the processor and memory and storing computer-executable instructions that when executed by at least a processor of a computer cause the computing system to:
access a graph representing a road network, wherein nodes of the graph are data structures that represent a geographical location where a turn may be made, wherein links of the graph are data structures that represent a traffic route between nodes, and wherein a compass heading for a link is calculated from beginning point coordinates of a first node that is at a beginning point of the link and ending point coordinates of a second node that is at an end point of the link;
developing a vehicle route from an origin node to a destination node in the graph, wherein cross-traffic turns are dynamically discouraged from inclusion in the vehicle route as a function of traffic density where oncoming traffic is heavy, wherein the vehicle route is developed by, for one or more of the nodes in the graph:
determine, for neighbor nodes of one of the nodes in the graph, that a path of the autonomous vehicle through the node from an arrival link to a departure link to the neighbor node crosses oncoming traffic,
in response to determining that the path of the autonomous vehicle to the neighbor node crosses the oncoming traffic, determine that the oncoming traffic is heavy,
in response to determining that the oncoming traffic is heavy, generate an estimated delay for the departure link to the neighbor node, wherein the estimated delay increases as a function of density of the oncoming traffic,
assign the neighbor node to have a cost that is the lesser of a previous cost assigned to the neighbor node and a cost that combines a cumulative cost to reach the node from the origin node and the estimated delay, and
select as the vehicle route a route from the origin node to the destination node that has a lowest total cost;
provide the vehicle route to the autonomous vehicle control system of the autonomous vehicle; and
operate, by the autonomous vehicle control system, the autonomous vehicle along the vehicle route through the path of the autonomous vehicle from the arrival link to the departure link across the oncoming traffic.

18. The computing system of claim 17, wherein the instructions further cause the computing system to:
for each link of the graph:
obtain the beginning point coordinates and the end point coordinates for the link,
calculate the compass heading for the link from the beginning point coordinates and end point coordinates for the link, and
store the compass heading for the link in the data structure describing the link;
determine whether the oncoming traffic is light or not light;
control the estimated delay to be (i) a pre-configured standard delay where the oncoming traffic is light, and (ii) a dynamically generated measure of delay based on estimated traffic density where the oncoming traffic is not light; and
when determining, for the departure link, that the path of the autonomous vehicle from the arrival link to the departure link crosses oncoming traffic:
retrieve an indication of a driving side of a road applicable to the graph;
retrieve a compass heading of each incoming and outgoing link with the node, including the arrival link and departure link;
determine that the compass heading of the arrival link and the compass heading of the departure link indicate that the path is a turn in a direction opposite the driving side of the road; and
determine that a first compass heading of a first link entering the node and of a first link exiting the node is opposite the compass heading of the arrival link.

19. The computing system of claim 17, wherein the autonomous vehicle is a delivery vehicle, and wherein the instructions further cause the computing system to:
include the vehicle route as part of a delivery schedule for the autonomous vehicle; and
operate the autonomous vehicle to a delivery stop of the delivery schedule.

20. The computing system of claim 19, wherein the delivery vehicle is either partially self-driving or fully self-driving.

* * * * *

UNITED STATES PATENT AND TRADEMARK OFFICE
CERTIFICATE OF CORRECTION

PATENT NO. : 12,163,795 B2  
APPLICATION NO. : 17/369074  
DATED : December 10, 2024  
INVENTOR(S) : van't Westeinde et al.

Page 1 of 1

It is certified that error appears in the above-identified patent and that said Letters Patent is hereby corrected as shown below:

On the Title Page

In Column 2, Item (57) under abstract, Line 9, delete "that that" and insert -- that --, therefor.

In the Specification

In Column 7, Line 15, delete "(nodeOutgingLinks)" and insert -- (nodeOutgoingLinks) --, therefor.

In Column 15, Line 5, delete "that that" and insert -- that --, therefor.

In Column 17, Line 67, delete "that that" and insert -- that --, therefor.

In Column 18, Line 1, delete "oncomingtraffic," and insert -- oncoming traffic, --, therefor.

In Column 18, Line 44, delete "that that" and insert -- that --, therefor.

In the Claims

In Column 32, Line 38, in Claim 1, after "graph," delete "a departure link,".

In Column 32, Line 40, in Claim 1, delete "by" and insert -- by: --, therefor.

Signed and Sealed this  
First Day of April, 2025

Coke Morgan Stewart  
*Acting Director of the United States Patent and Trademark Office*